US009065321B2

(12) United States Patent
Divan et al.

(10) Patent No.: US 9,065,321 B2
(45) Date of Patent: Jun. 23, 2015

(54) ISOLATED DYNAMIC CURRENT CONVERTERS

(71) Applicants: Deepakraj M. Divan, San Jose, CA (US); Anish Prasai, San Jose, CA (US); Hao Chen, San Jose, CA (US)

(72) Inventors: Deepakraj M. Divan, San Jose, CA (US); Anish Prasai, San Jose, CA (US); Hao Chen, San Jose, CA (US)

(73) Assignee: VARENTEC, INC., Santa Clara, CA (US)

( * ) Notice: Subject to any disclaimer, the term of this patent is extended or adjusted under 35 U.S.C. 154(b) by 233 days.

(21) Appl. No.: 13/726,524

(22) Filed: Dec. 24, 2012

(65) Prior Publication Data

US 2013/0201733 A1    Aug. 8, 2013

Related U.S. Application Data

(60) Provisional application No. 61/579,610, filed on Dec. 22, 2011.

(51) Int. Cl.
*H02M 3/335* (2006.01)
*H02M 1/00* (2007.01)
(Continued)

(52) U.S. Cl.
CPC ...... *H02M 1/00* (2013.01); *H02M 7/02* (2013.01); *H02M 5/00* (2013.01); *H02M 7/42* (2013.01);
(Continued)

(58) Field of Classification Search
CPC ......... H02M 5/00; H02M 5/10; H02M 5/458; H02M 5/4585; H02M 3/33584
USPC ............ 363/65, 84, 89, 95, 97, 98, 157, 159, 363/163, 164, 165, 170, 171, 34, 37
See application file for complete search history.

(56) References Cited

U.S. PATENT DOCUMENTS 3,487,289 A * 12/1969 McMurray .................... 363/161
3,517,300 A *  6/1970 McMurray ...................... 363/25
(Continued)

FOREIGN PATENT DOCUMENTS

WO    2004114495 A1    12/2004
WO    2005085969 A1     9/2005

OTHER PUBLICATIONS

Patent Cooperation Treaty International Searching Authority, International Search Report for PCT/US2012/068307, Feb. 14, 2013, pp. 1-2.

(Continued)

*Primary Examiner* — Gary L Laxton
(74) *Attorney, Agent, or Firm* — Sheppard Mullin Richter & Hampton LLP

(57) ABSTRACT

Isolated Dynamic-Current ("Dyna-C") converters are converters that convert incoming 3-phase AC or DC power to a mix of DC and AC power via an isolation link. In various embodiments, the isolation link is a high-frequency isolation transformer. Isolated Dyna-C converters may provide a high-frequency galvanic isolation and are able to convert three-phase AC power to three-phase AC power, or three-phase AC power to DC and vice versa. The topology is minimal and the costs are low. Isolated Dyna-C converters provide fast current responses and keep the losses low by using a simplified two-stage conversion and providing a magnetizing current that is dynamically controllable and tailored to the load. An isolated Dyna-C converter may synthesize currents at its input or output ports with an arbitrary phase that is relative to the grid or load voltages, thereby enabling a full independent control over the active and reactive power at its ports.

21 Claims, 27 Drawing Sheets

(51) Int. Cl.
*H02M 7/02* (2006.01)
*H02M 5/00* (2006.01)
*H02M 7/42* (2006.01)
*H02M 5/22* (2006.01)
*H02M 7/23* (2006.01)
*H02M 7/48* (2007.01)
*H02M 7/493* (2007.01)
*H02M 5/458* (2006.01)
*H02M 1/12* (2006.01)

(52) U.S. Cl.
CPC .......... *H02M 1/126* (2013.01); *H02M 3/33576* (2013.01); *H02M 5/225* (2013.01); *H02M 7/23* (2013.01); *H02M 7/4807* (2013.01); *H02M 7/493* (2013.01)

(56) References Cited

U.S. PATENT DOCUMENTS

| | | | |
|---|---|---|---|
| 4,365,190 A | 12/1982 | Pasternack et al. | |
| 5,402,057 A | 3/1995 | D'Aquila et al. | |
| 5,563,777 A | 10/1996 | Miki et al. | |
| 5,686,766 A | 11/1997 | Tamechika | |
| 6,181,113 B1 | 1/2001 | Hu et al. | |
| 6,573,691 B2 | 6/2003 | Ma et al. | |
| 7,091,703 B2 | 8/2006 | Folts et al. | |
| 7,149,605 B2 | 12/2006 | Chassin et al. | |
| 8,199,545 B2* | 6/2012 | Nguyen et al. | 363/165 |
| 8,378,646 B2* | 2/2013 | Shimada et al. | 323/222 |
| 8,559,193 B2* | 10/2013 | Mazumder | 363/8 |
| 8,705,251 B2* | 4/2014 | Matsui et al. | 363/16 |
| 2004/0254688 A1 | 12/2004 | Chassin et al. | |
| 2005/0194944 A1 | 9/2005 | Folts et al. | |
| 2006/0233000 A1* | 10/2006 | Akagi | 363/37 |
| 2009/0024255 A1 | 1/2009 | Penzenstadler et al. | |
| 2010/0198422 A1 | 8/2010 | Feng | |
| 2010/0231235 A1 | 9/2010 | Cho | |
| 2010/0259100 A1 | 10/2010 | Hamstra et al. | |
| 2011/0074215 A1 | 3/2011 | Vartanian et al. | |
| 2011/0149618 A1 | 6/2011 | Babcock et al. | |
| 2011/0192838 A1 | 8/2011 | Fujita et al. | |
| 2011/0205674 A1 | 8/2011 | Divan | |

OTHER PUBLICATIONS

Patent Cooperation Treaty International Searching Authority, International Search Report for PCT/US2012/068316, Feb. 7, 2013, pp. 1-2.
Wilson, Tom, "A Comparison of AdaptiVolt(TM) and Line Drop Compensation Conservation Voltage Regulation Implementation Methodologies", PCS UtiliData, Dec. 2010, pp. 1-7, Spokane, WA.
Patent Cooperation Treaty, International Search Report for PCT/US2012/055619, Dec. 3, 2012, pp. 1-2.
State Intellectual Property Office of PRC, Notification of First Office Action for CN Patent Application No. 201280056392.2, Dec. 25, 2014, pp. 1-2.
State Intellectual Property Office of PRC, Notification of First Office Action for CN Patent Application No. 2012800691846, Feb. 6, 2015, pp. 1-2.

* cited by examiner

ISOLATED DYNAMIC CURRENT CONVERTERS

CROSS-REFERENCE TO RELATED APPLICATIONS

This application claims benefit of U.S. Provisional Patent Application No. 61/579,610, filed on Dec. 22, 2011, entitled "Systems and Methods for Managing Power", which is hereby incorporated herein by reference in its entirety.

TECHNICAL FIELD

The present invention(s) relate generally to galvanically isolated current based converters. More particularly, the invention(s) relate to systems and methods of bi-directional converters, implementation, and control thereof.

DESCRIPTION OF THE RELATED ART

With the advancement in technologies, solid-state converters are used in a wide range of applications, from small switching power supplies in personal electronics to large power systems that transmit electric power. These converters may convert alternating current (AC) power to direct current (DC) power, or vice versa. When galvanic isolation is required, multi-stage conversion is necessary for converting AC power to AC power or AC power to DC power, which increases losses and complexity significantly.

Voltage source based converters are converters that accept input from a power supply that acts as a voltage source. A voltage source based converter produces an AC voltage by switching the input voltage to provide positive and negative voltage pulses using a high frequency carrier waveform. The output voltages pulses are fed through a low frequency filter. Large DC capacitors are required to minimize stage-to-stage dynamic interaction and to improve stability, which makes these topologies expensive and have limited life. Moreover, efficiencies of voltage source based converters are low due to fixed DC voltages, and the need for multiple conversion stages when galvanic isolation is desired. Under fault conditions, voltage source based converters require very fast protection, but high fault currents are still challenging to the protection system. Additionally, voltage source based converters require large inductive filters on the AC line side, which further adds costs and size, and increases control complexity.

Dual active bridge (DAB) converters and its various iterations are often selected for providing the high-frequency isolation under bi-directional power flow. A voltage source based inverter is usually cascaded with a DAB, which operates as a DC-DC stage for inverting DC power to AC power. With every stage included in the power conversion chain, system efficiency deteriorates while complexity, volume, and cost increase. As a result, for a full three-phase AC to three-phase AC power conversion, energy flows through four different bridges (for example, a stage of low frequency rectification, a stage of high frequency inversion, a high frequency transformer, a stage of high frequency rectification, and a stage of low frequency inversion). As an alternative, a two-stage AC-AC DAB converters have been proposed, but are seen to have a limited operating range due to the use of single-phase sinusoidal sources and the subsequent inability to synthesize waveforms of arbitrary phase and frequency. Furthermore, the use of AC or bi-directional switches increases the complexity and complicates fault management.

Electrolytic capacitors are necessary for providing bulk energy storage for voltage source based inverters, which pose significant life and reliability challenges. Although current source based inverters do not suffer from the requirement for electrolytic capacitors, their applications have been extremely limited due to cost and performance issues. Moreover, current-based inverters cannot be cascaded to provide high-frequency galvanic isolation with bi-directional power flow control.

Though flyback converters may provide high-frequency isolation, they are limited only to uni-directional DC-DC converter applications at very low power levels (for example, less than 200 W). They are limited from scaling to high power applications because of high device ratings and the inability to manage the energy trapped in the transformer leakage inductance without significant losses. Therefore, to date, flyback converters have not been considered as desirable for three-phase applications.

BRIEF SUMMARY OF EMBODIMENTS OF THE INVENTION

Isolated Dynamic-Current ("Dyna-C") converters are converters that convert incoming 3-phase AC or DC power to a mix of DC and AC power via an isolation link. In various embodiments, the isolation is a high-frequency transformer. Various embodiments provide bi-directional converters that are current source based with dynamic current response capability. Various embodiments may provide AC/AC, DC/DC, AC/DC, or DC/AC power conversions. Some embodiments that convert AC power to DC power may comprise two-quadrant switches that block voltages in both directions but conduct current in only one direction. The topology is minimal and the costs are low. Isolated Dyna-C converters provide fast current responses and keep the losses low by using a simplified two-stage conversion and providing a magnetizing current that is dynamically controllable and tailored to the load. Various embodiments may be stacked to scale to higher voltages. In further embodiments, inductive or capacitive VAR compensation may be provided.

According to various embodiments of the invention, various bi-directional isolated Dyna-C converters are provided. Isolated Dyna-C converters may provide a high-frequency galvanic isolation and are able to convert three-phase AC power to three-phase AC power, or three-phase AC power to DC and vice versa. Various embodiments may comprise two or more bridges coupled with a transformer. The bridges may be DC, single-phase AC or three-phase AC. In one embodiment, the transformer is a single, multi-winding, and high-frequency transformer. Various embodiments may utilize DC or AC power to maintain a DC magnetizing current of the transformer to compensate for losses. In further embodiments, energy stored in the transformer is used to synthesize a DC or AC power. In some embodiments, the magnetizing current may be regulated to a different value based on the load requirements to maintain a high system efficiency across a broad loading range. One embodiment may synthesize currents at its input or output ports with an arbitrary phase that is relative to the grid or load voltages, thereby enabling a full independent control over the active and reactive power at its ports. In further embodiments, input currents are maintained in phase with the grid voltages thereby achieving a unity power factor.

Various embodiments can interface to AC and DC sources and loads, and thus are suitable for many applications. For example, PV farms, energy warehouses, interfaces with generators in wind turbines, data centers, and substations.

Because their input and output ports may terminate into a small filter capacitor that limits the instantaneous rate of voltage change (dv/dt) to a low rate, various embodiments can easily be series stacked on a single-phase or DC basis to scale to medium voltages. Some embodiments may be employed in applications requiring high current DC power supplies. In some embodiments, individual cells may be controlled by phase staggering. Multiple cells may be paralleled on the input and/or output ports to increase power ratings and to minimize filter sizes by reducing current ripple. Some embodiments may support unbalanced three-phase AC loads via either three single-phase bridges or a single three-phase-four-wire bridge.

In one embodiment, VAR compensation is provided. The current is controlled to lead or lag the voltage by 90 degrees. Three single-phase bridges may be coupled together with a single three-winding high-frequency transformer to provide VAR compensation. Some embodiments with VAR compensation ability may operate at medium voltages by series stacking Dyna-C modules which are series stackable to operate at medium voltages.

In various embodiments, a method of the leakage management is provided. The method may manage the energy trapped in the transformer leakage inductance at the time of a switch being turned off. In one embodiment, the energy management function is provided by lossy or lossless snubber circuits. In various embodiment, the leakage management may be via a sequenced control of the outgoing and incoming bridge switches.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Figure 1A:
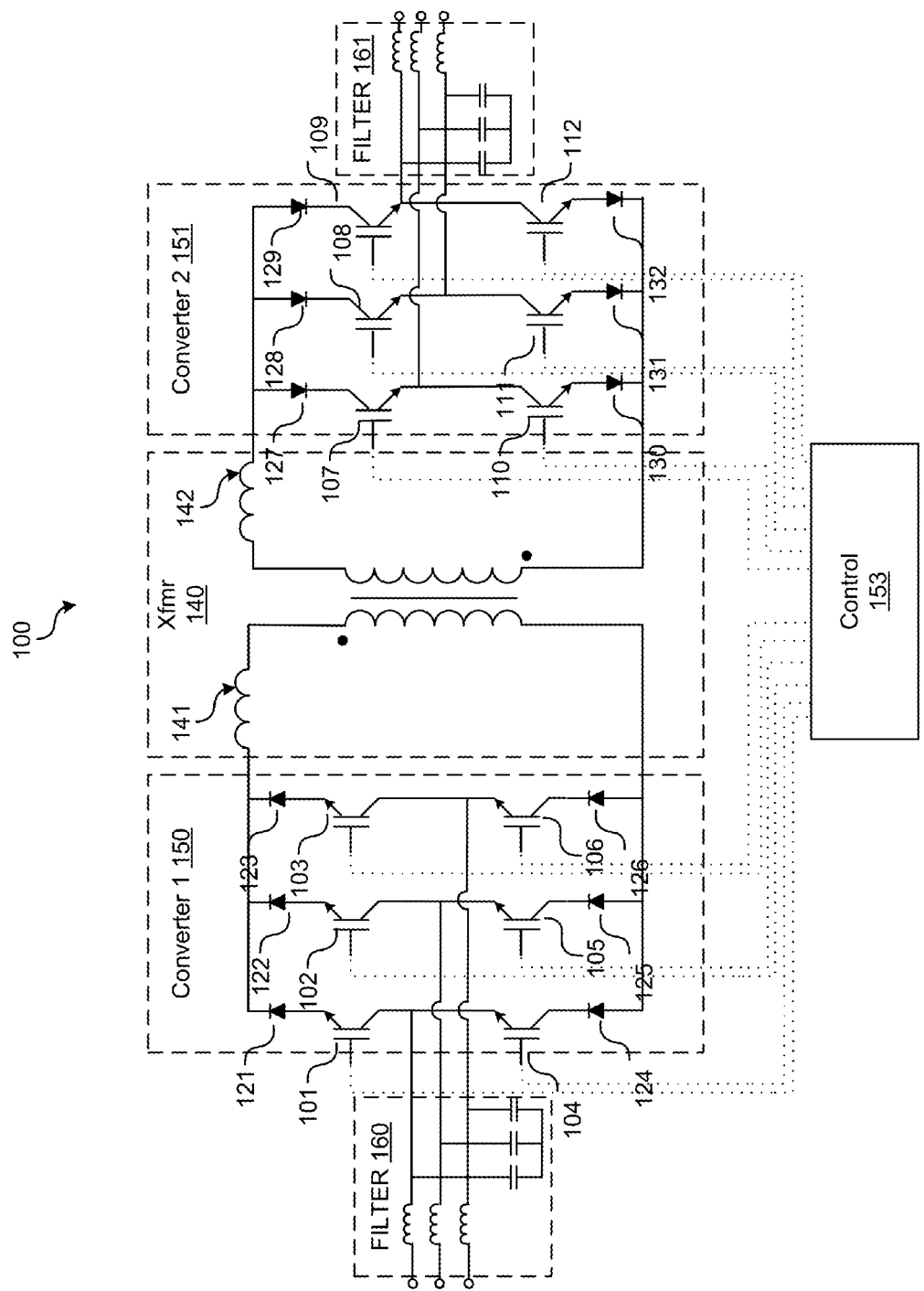
FIG. 1A is a schematic diagram illustrating a Dyna-C solid state transformer in accordance with an embodiment.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Conventional converters with high-frequency isolation usually comprise an AC/DC conversion stage, followed by a DC/DC with high-frequency isolation, which is followed by a DC/AC conversion stage. Solid state transformers with such configuration have high switch counts with additional controllers, gate drives, sensors and heatsinks. These solid state transformers are expensive, large, complex, and have poor efficiency due to multiple devices in the current conduction path.

Isolated dynamic current ("Dyna-C") converters are provided. One embodiment comprises a first single-stage converter, a high-frequency transformer, and a second single-stage converter. The first single stage converter may comprise reverse current blocking semiconductor switches and is coupled to an AC or DC voltage source. The first single stage converter may be further coupled to a high-frequency transformer, which is coupled to the second single-stage converter. The second single-stage converter may be coupled to an AC or DC output source. In various embodiments, an isolated Dyna-C converter may be controlled to transfer power in a desired direction with high efficiency.

In applications that require galvanic isolation, isolated Dyna-C converters may provide significant advantage over the conventional combination of a 60 Hz transformer and a converter, especially if bidirectional power flow and/or multiport operation are desired. Applications include telecoms (for example, three-phase AC to 48V DC conversion), server input supplies, industrial power supply and motor drive applications and defenses (for example, micro-grids, ships, and aircrafts). Various embodiments may provide a back-to-back system at 400 Hz and the ability to isolate fault currents on vehicles such as ships and planes without adding weight and losing responses. As a micro-grid input device, various embodiments can improve power quality and reliability and implement droop and angle based controls. One embodiment may be used to implement a wild frequency system on planes with different frequencies in different loops, without adding too much weight, while improving operation under various fault modes. In one embodiment, a compact and cost-competitive solution is provided, for example, low Total Harmonic Distortion ("THD") on the AC line.

Multiple embodiments may be staggered for achieving the best ripple performance. Embodiments of different ratings may also be mixed and matched. In various embodiments, platforms may be built around 50 A, 150 A, 400 A and 1000 A IGBT modules (1700V) corresponding to 15, 50, 125 and 300 kVA, respectively. IGBTs may switch at 15-20 kHz. For each phase, one embodiment may be doubled and staggered to provide up to 600 kVA, with further paralleling operation that extends the power range to over 2 MVA. As a non-utility application, fault current issue may be more manageable. Having no electrolytic capacitors provide space reduction and life and reliability improvements. In various embodiments, redundancy is provided through paralleled modules. When a module fails, the system may continue to operate at a derated performance until the scheduled maintenance. One embodiment may be implemented in wind mills to provide a compact and isolated power conversion design that is scalable to MV levels right at the nacelle.

Figure 11:
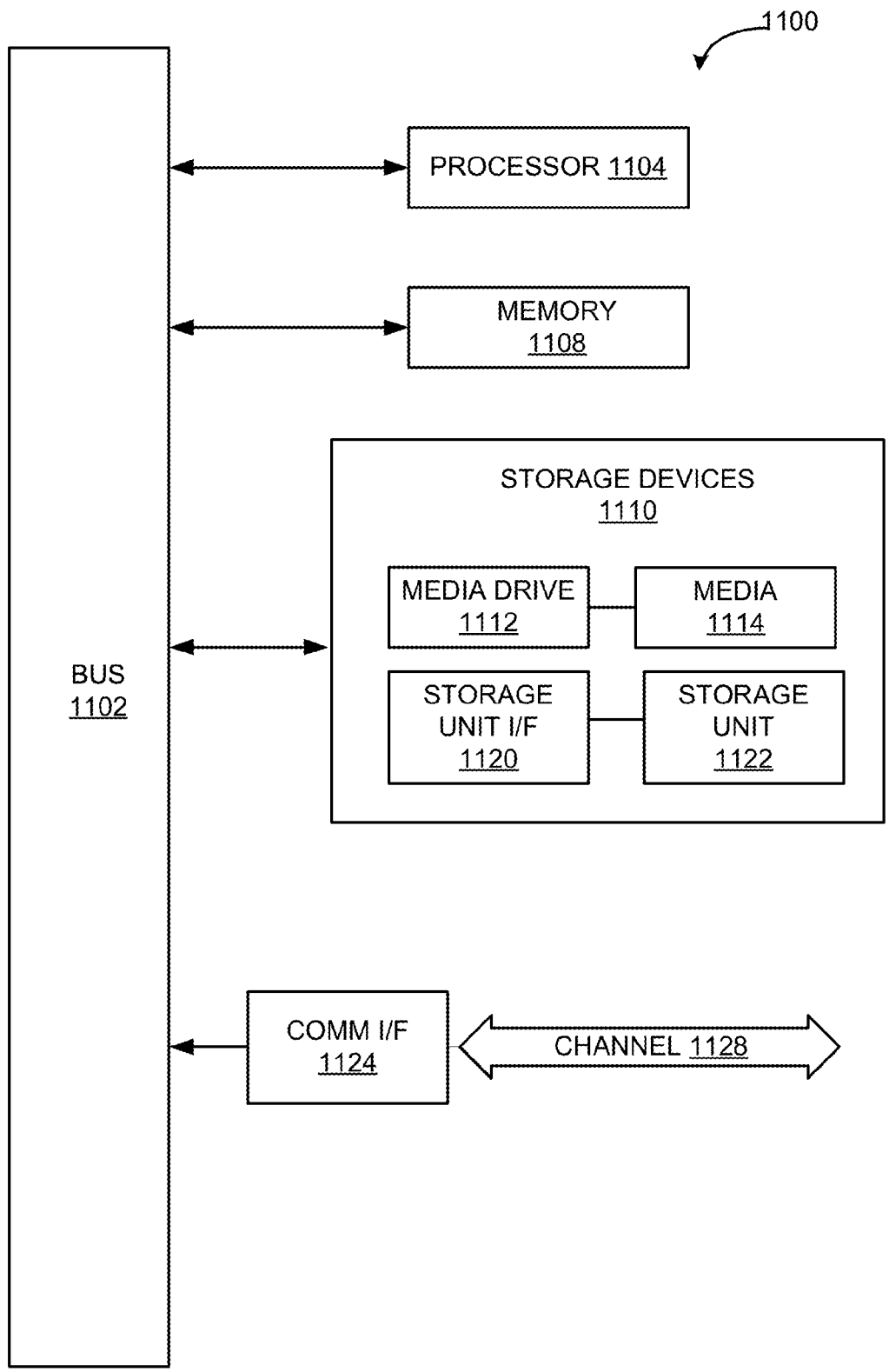
FIG. 11 illustrates an example computing module that may be used in implementing various features of embodiments of the invention.

FIG. 1A is a schematic diagram illustrating a Dyna-C solid state transformer 100 in accordance with an embodiment. The illustrated example comprises a first converter 150, a transformer 140, a second converter 151, a control module 153, an input filter 160 and an output filter 161. The first converter 150 comprises switches 101-106 and diodes 121-126. The second converter 151 comprises switches 107-112 and the diodes 127-132. The control module 153 may regulate the duty cycles of both converters 150 and 151. In various embodiments, the control module 153 may be implemented by an example computing module as illustrated in FIG. 11. One of ordinary skill in the art will understand that the control module 153 may be provided with the appropriate voltage(s) and current(s) measured by various sensors. In the illustrated example, the Dyna-C solid state transformer 100 is a three-phase transformer, isolating an input three phase AC source and an output three phase AC source. The solid state transformer comprises IGBTs 101-112, diodes 121-132, a transformer 140, inductor filters 141-142, and a control module 153. In various embodiments, the transformer 140 may be a high frequency transformer. The IGBTs 101-112 function as switches and are regulated by the control module 153. One of ordinary skill in the art will appreciate that other semiconductor devices such as gate turn-off thyristors and MOSFETs may be implemented as switches. In further embodiments, a Dyna-C solid state transformer may comprise a set of input capacitor filters and a set of output capacitor filters (for example, within the filters 160 and 161). As illustrated, the Dyna-C solid state transformer's topology is minimal as it eliminates the additional conversion stages, energy storage and large filtering stages that are required in conventional solid state transformer implementations. In various embodiments, this topology may allow expansion for multi-port applications, such as by using "pulse-distribution" technologies.

The inductors comprised in the filters 160 and 161 may be maintained reasonably small to allow quick change in the current, but provide good filtering as they only act on the filtered voltage across the capacitive filter. Compared with an equivalently rated grid connected voltage source inverter, the inductors comprised in the input and output LC filters 160 and 161 are very small. Further, the capacitors of the input filter 160 are also very small. The Dyna-C solid state transformer 100 does not require resonant components. The number of switches is half of what would typically be needed for a conventional AC/DC/DC/AC OR AC/high frequency-AC/AC converters, as two entire stages of power conversion are eliminated. The voltage across the switches is very well defined, and are based on the input or output line voltage applied across the input/output bridge. In further embodiments, the series diodes 121-132 may be Silicon Carbide (Sic) or Gallium Nitride (GaN).

Inductors 141 and 142 illustrate the equivalence of the leakage inductance of the transformer 140. The leakage inductance of the transformer 140 is the main parasitic of the Dyna-C solid state transformer 100 and the air gap of the transformer 140 may be used to store energy of the magnetizing inductance. One bridge with two active switches of the Dyna-C solid state transformer 100 operates at a time. When a bridge-to-bridge commutation occurs, energy trapped in the leakage inductance of the transformer needs to be managed. Improper management may lead to high device stresses, which may cause device destruction or high converter losses. The control module 153 may perform leakage management to manage trapped leakage energy to prevent destruction of various devices. Accordingly, a power transfer modulation and control cycle comprising the leakage management is crucial to implementing the two-stage power conversion function. In one embodiment, the transformer size may be reduced by pre-biasing the air gap with a magnet.

The input filter 160 and the output filter 161 may suppress the high frequency component(s) in the current pulses and extract the fundamental or DC component. As illustrated, the filters 160 and 161 are second-order LC filters. As the inductors of the input or output filters are connected on the other side of the capacitor relative to the bridge, and the inductor aspect already exists in most grid or drive applications, the inductors of the input and output filters may be reduced in size or eliminated. The high-frequency switching of the devices enables reduction in size of the input and output filter capacitors. Accordingly, a very compact design with a high power density is provided.

Figure 1B:
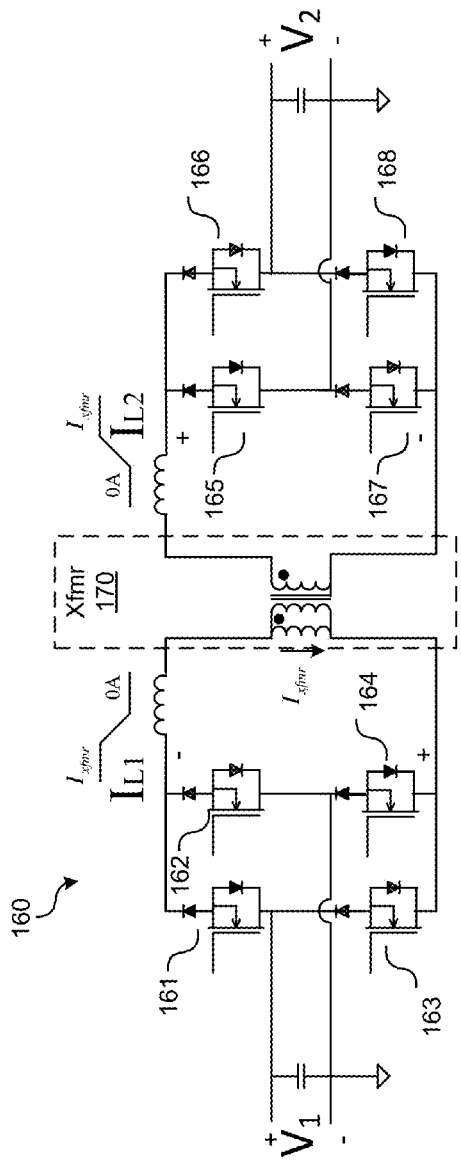
FIG. 1B is a diagram illustrating the principle of leakage management in accordance with an embodiment.

FIG. 1B is a diagram illustrating the principle of leakage management in accordance with an embodiment. As illustrated in FIG. 1B, the Dyna-C solid state converter 160 operates using the basic principle of flyback converters: only one bridge operates at a time and energy is converted via a bridge-to-bridge commutation from the primary side to a secondary side or a tertiary side. In the illustrated example, switches 162 and 163 on the primary bridge are switched on, and switches 166 and 167 on the secondary bridge are switched on. The energy trapped in the leakage inductance of the transformer 170 may be managed by controlling an overlap period where both the primary and secondary bridges are active. In the illustrated example, the primary bridge is the outgoing bridge and the secondary bridge is the incoming bridge as the energy in the leakage inductance is transferred from the primary bridge to the secondary bridge with negligible dissipation.

For example, when the primary bridge is operating, the magnetizing current of the transformer 170 equals to the leakage inductance current on the primary side of the transformer 170. The current through the transformer $I_{xfmr}$ is continuous and can be assumed to be constant, and this current is the magnetizing current. To move operation to the secondary bridge, the current in the primary leakage (the leakage inductance on the primary side of the transformer) of the transformer 170 needs to be reduced from $I_{xfmr}$ to zero, and simultaneously, the current in the secondary leakage (the leakage inductance on the secondary side of the transformer) of the transformer 170 needs to be increased from zero to $I_{xfmr}$. During the leakage management period, a method reverses the voltage across the leakage inductance of the transformer 170 drop the current through the outgoing bridge to zero. In one embodiment, the method of leakage management makes the previous outgoing bridge apply a negative voltage across the transformer winding, while making the incoming bridge apply a positive voltage across the transformer winding. Accordingly, the voltage applied across the leakage inductance is reversed thereby reversing the direction of the current. After the current on the outgoing bridge has dropped to zero, the method turns off the outgoing bridge and the incoming bridge may start its normal operation.

Figure 1C:
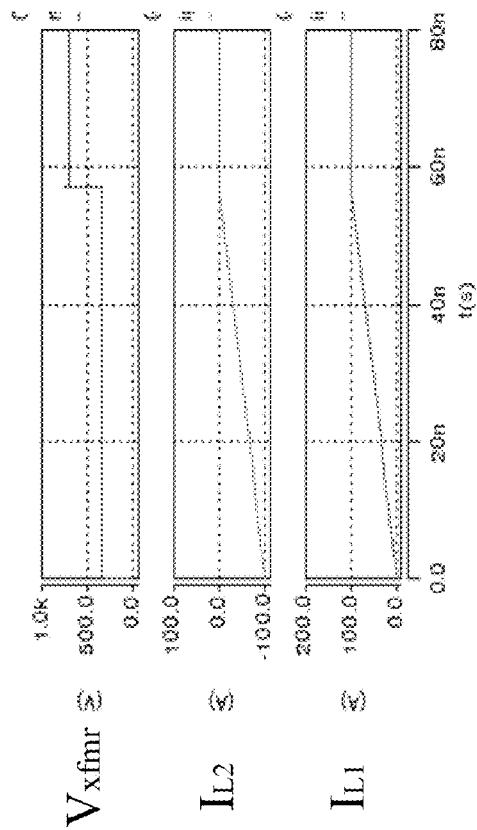
FIG. 1C are simulation waveforms illustrating a leakage management transition.

FIG. 1C are simulation waveforms illustrating a leakage management transition.

Figure 2A:
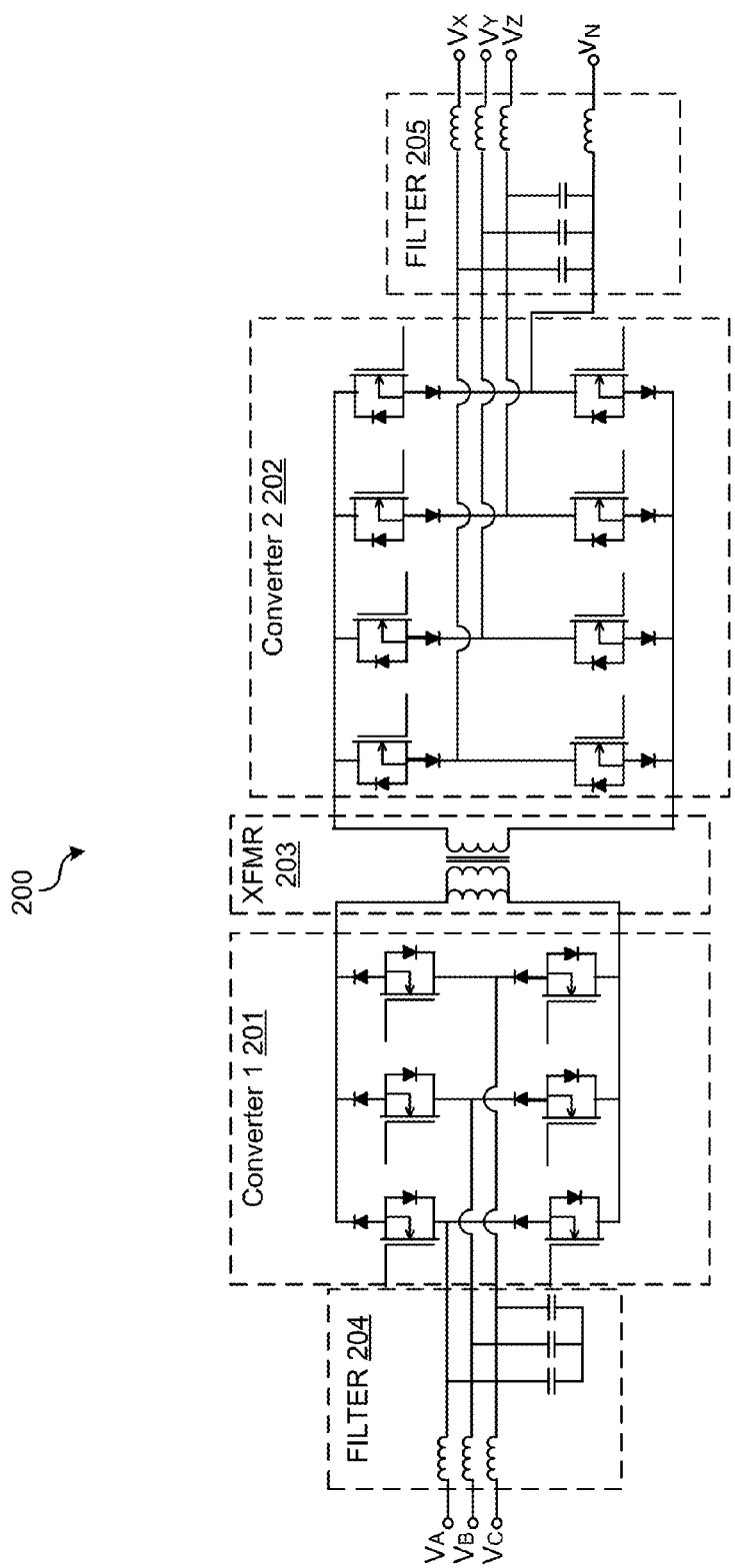
FIG. 2A is a schematic diagram of a Dyna-C solid state transformer capable of handling unbalanced currents in accordance with an embodiment.

FIG. 2A is a schematic diagram of a Dyna-C solid state transformer 200 capable of handling unbalanced currents in accordance with an embodiment. The illustrated example comprises converters 201 and 202, a transformer 203, and filters 204-205. The Dyna-C converter 200 comprises a three-phase output with four wires. The Dyna-C solid state transformer 200 may be used in applications with unbalanced currents, such as systems with a single-phase load or unbalanced currents. The converter 201 is the primary converter and the converter 202 is the secondary converter. The primary converter 201 and the secondary converter 202 alternate the operation, with its respective time period of $T_p$ and $T_n$, where the total period T is the sum of these two periods: $T=T_p+T_n$. The Dyna-C solid state transformer 200 may comprise a control module (not shown) controlling the operation of the solid state transformer 200, for example, regulating the duty cycles of converters 201 and 202, and performing leakage management.

Figure 2B:
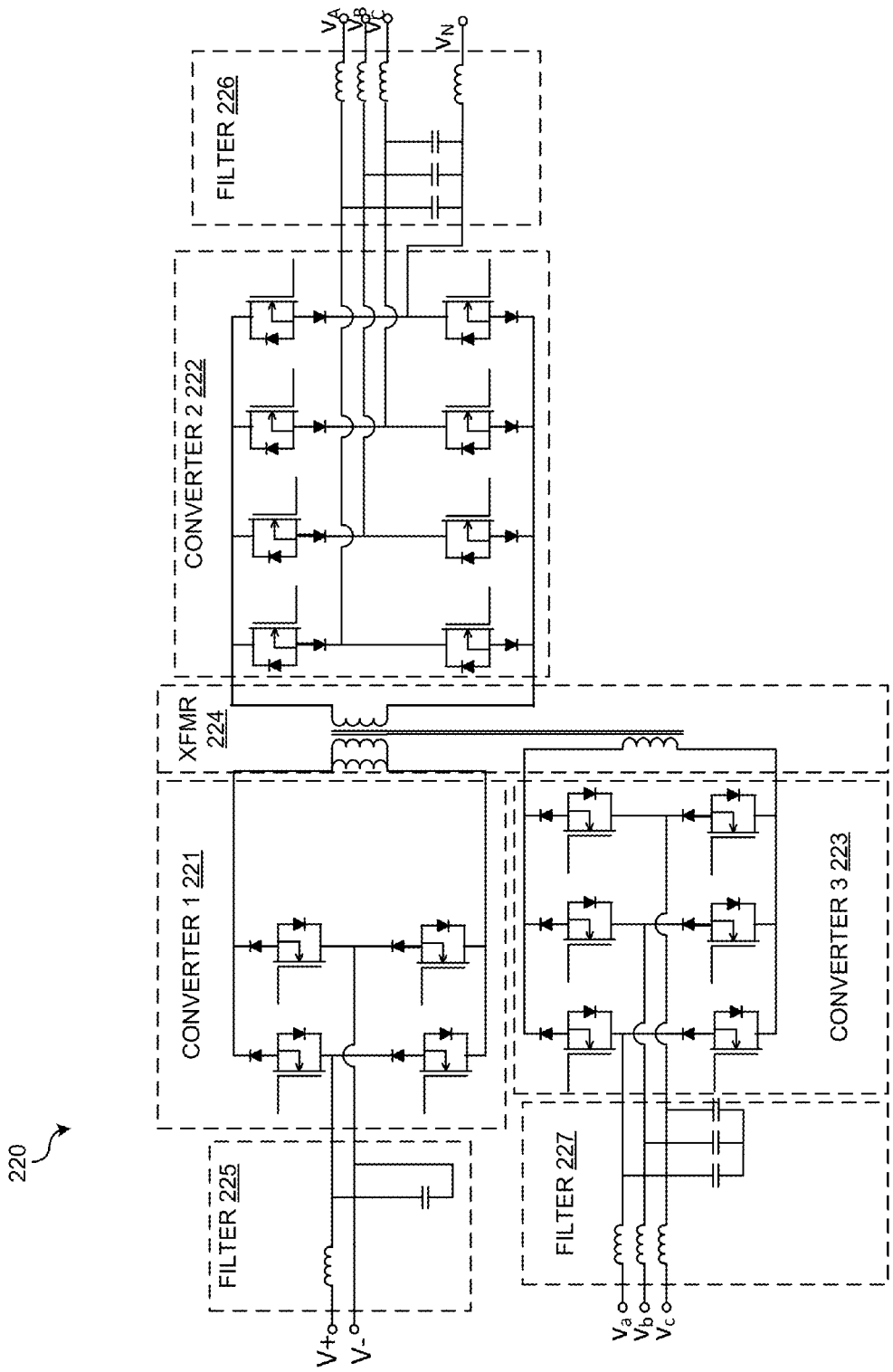
FIG. 2B is a schematic diagram of a multi-port Dyna-C solid state transformer in accordance with an embodiment.

FIG. 2B is a schematic diagram of a multi-port Dyna-C solid state transformer 220 in accordance with an embodiment. The multi-port Dyna-C solid state transformer 220 comprises a DC port, a three-phase AC port with three legs, and a three-phase AC port with four legs. The illustrated example comprises converters 221-223, a transformer 224, and filters 225-227. The converter 221 may be coupled to a DC source such as a DC power source or a DC load. The converter 222 may be coupled to an AC source such as an AC power source or an unbalanced AC load. The converter 223 may be coupled to an AC source such as an AC power source or a balanced AC load. As such, the Dyna-C solid state transformer 220 may provide bi-directional AC/DC, DC/AC, or AC/AC power conversions. The Dyna-C solid state transformer 220 may comprise a control module (not shown) controlling the operation of the solid state transformer 220, for example, regulating the duty cycles of converters 221-223, and performing the leakage management.

Figure 2C:
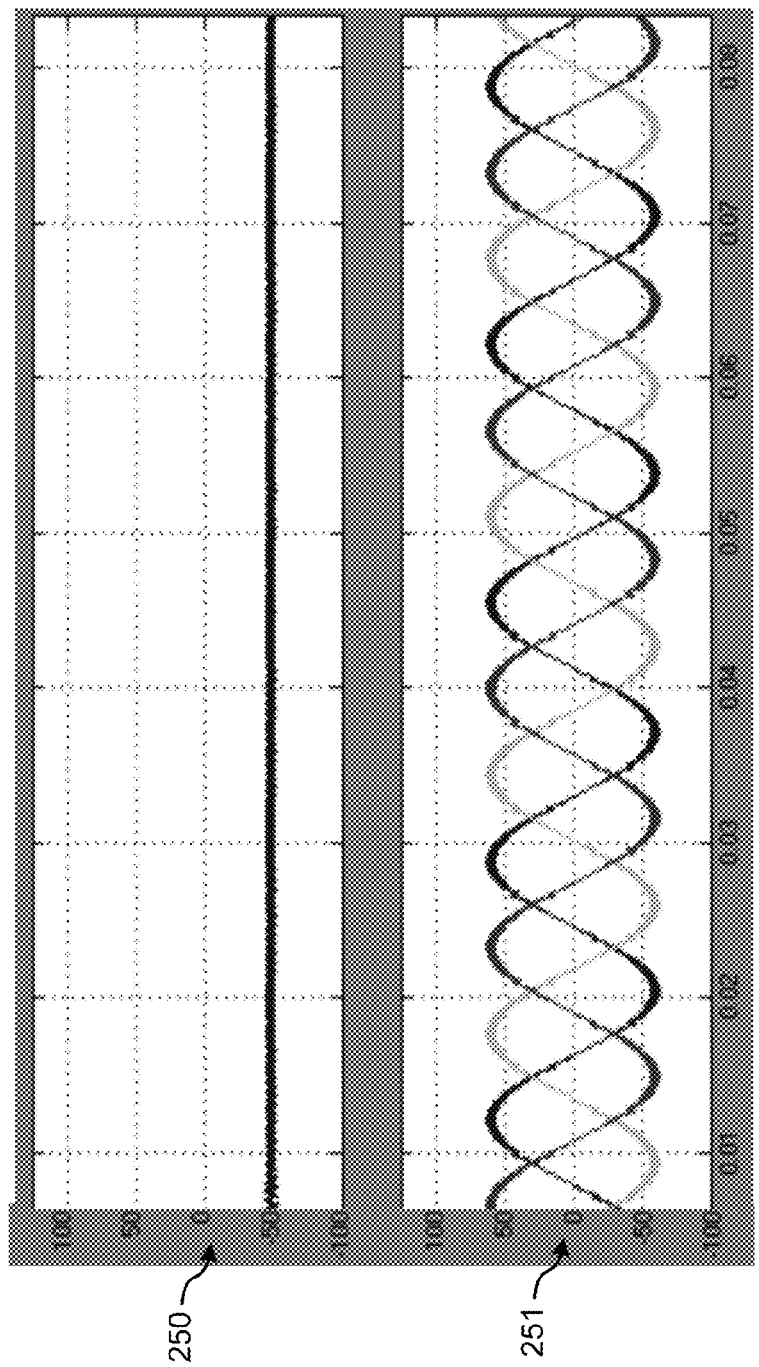
FIG. 2C are simulation waveforms illustrating the operation of a Dyna-C AC/DC converter in accordance with an embodiment.

FIG. 2C are simulation waveforms illustrating the operation of a Dyna-C AC/DC converter in accordance with an embodiment. The waveform 250 illustrates the output DC current and the waveform 251 illustrate the input AC currents.

Figure 2D:
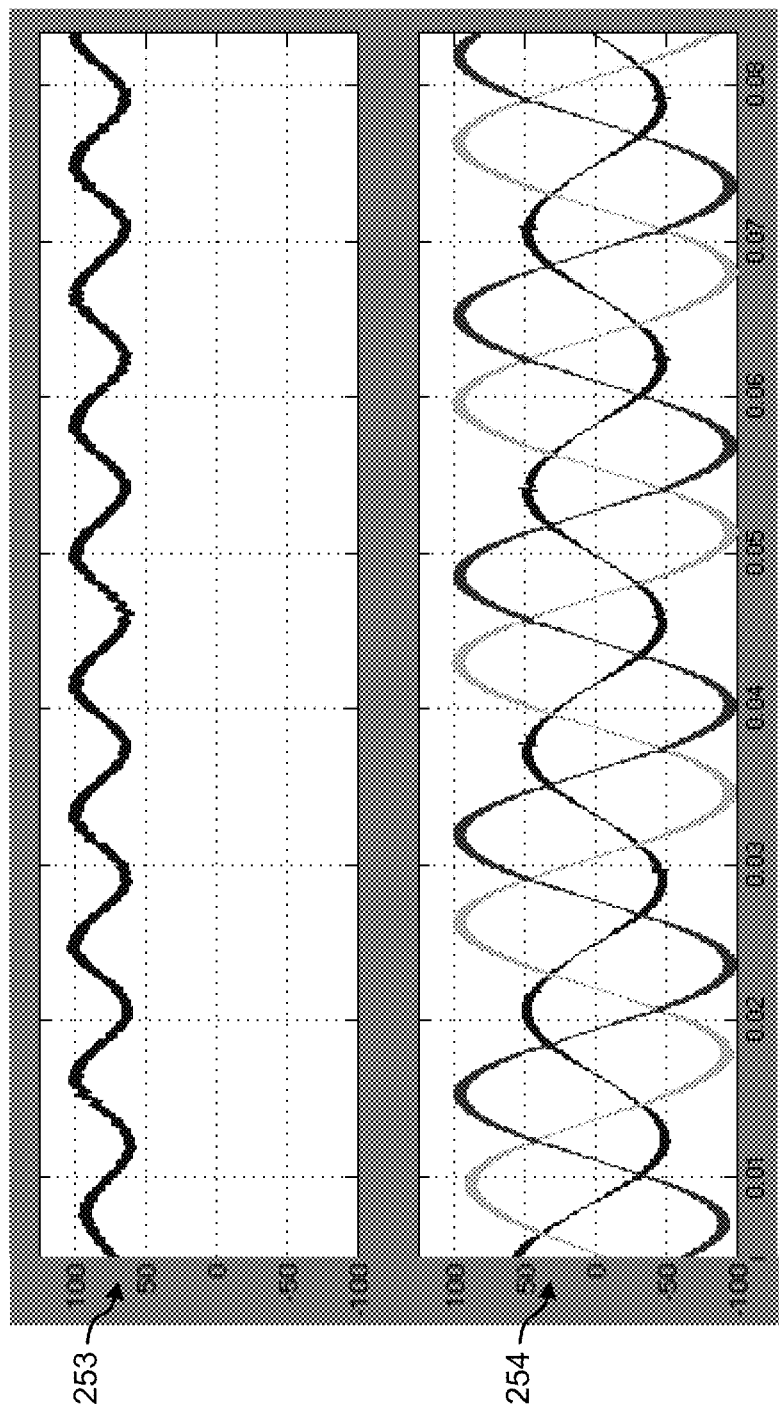
FIG. 2D are simulation waveforms illustrating the operation of a Dyna-C DC/AC converter with four legs in accordance with an embodiment.

FIG. 2D are simulation waveforms illustrating the operation of a Dyna-C DC/AC converter with four legs and operating with an unbalanced load in accordance with an embodiment. The waveform 253 illustrates the input DC current and the waveform 254 illustrates the output AC currents. As illustrated, the output AC currents are unbalanced. Due to the minimal energy storage present in the transformer, the unbalance is reflected back to the DC side through a 120 Hz ripple.

Figure 2E:
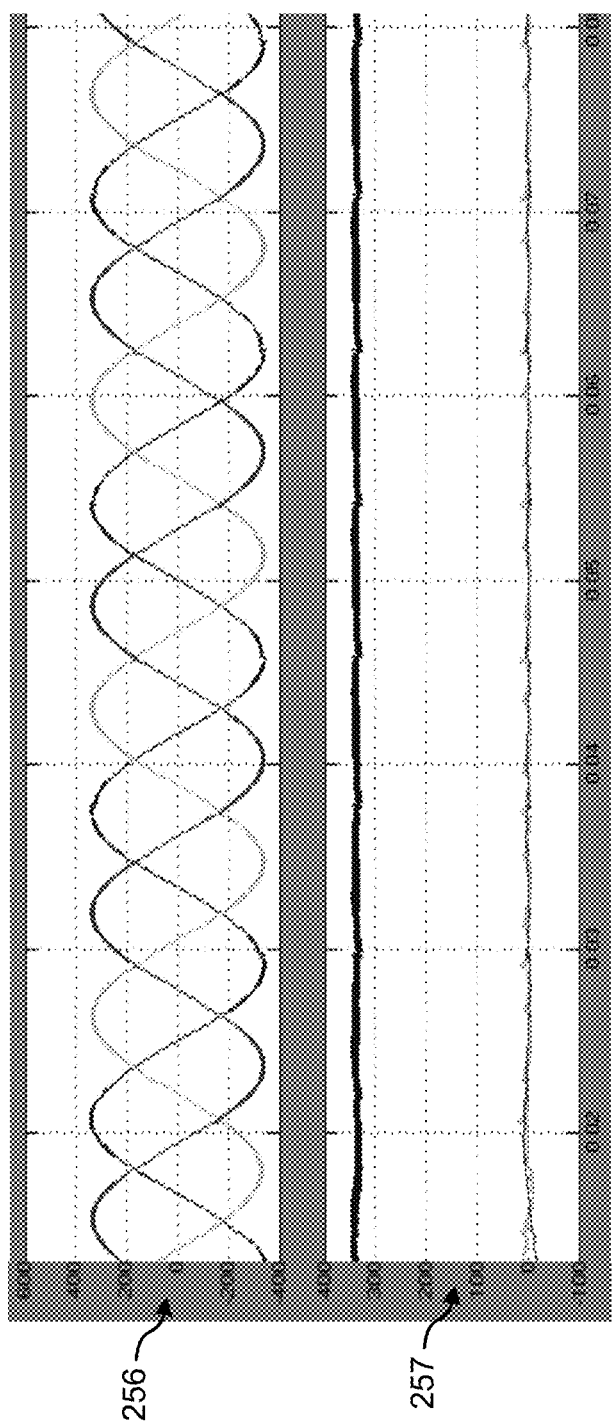
FIG. 2E are simulation waveforms illustrating the operation of a Dyna-C DC/AC converter with four legs in accordance with an embodiment.

FIG. 2E are simulation waveforms illustrating the operation of a Dyna-C DC/AC converter with four legs in accordance with an embodiment. The waveform 256 illustrates the output AC voltages in the stationary reference frame and the waveform 257 illustrates the output AC voltages in the rotating or DQ0 reference frame where the voltages are DC quantities.

Figure 3A:
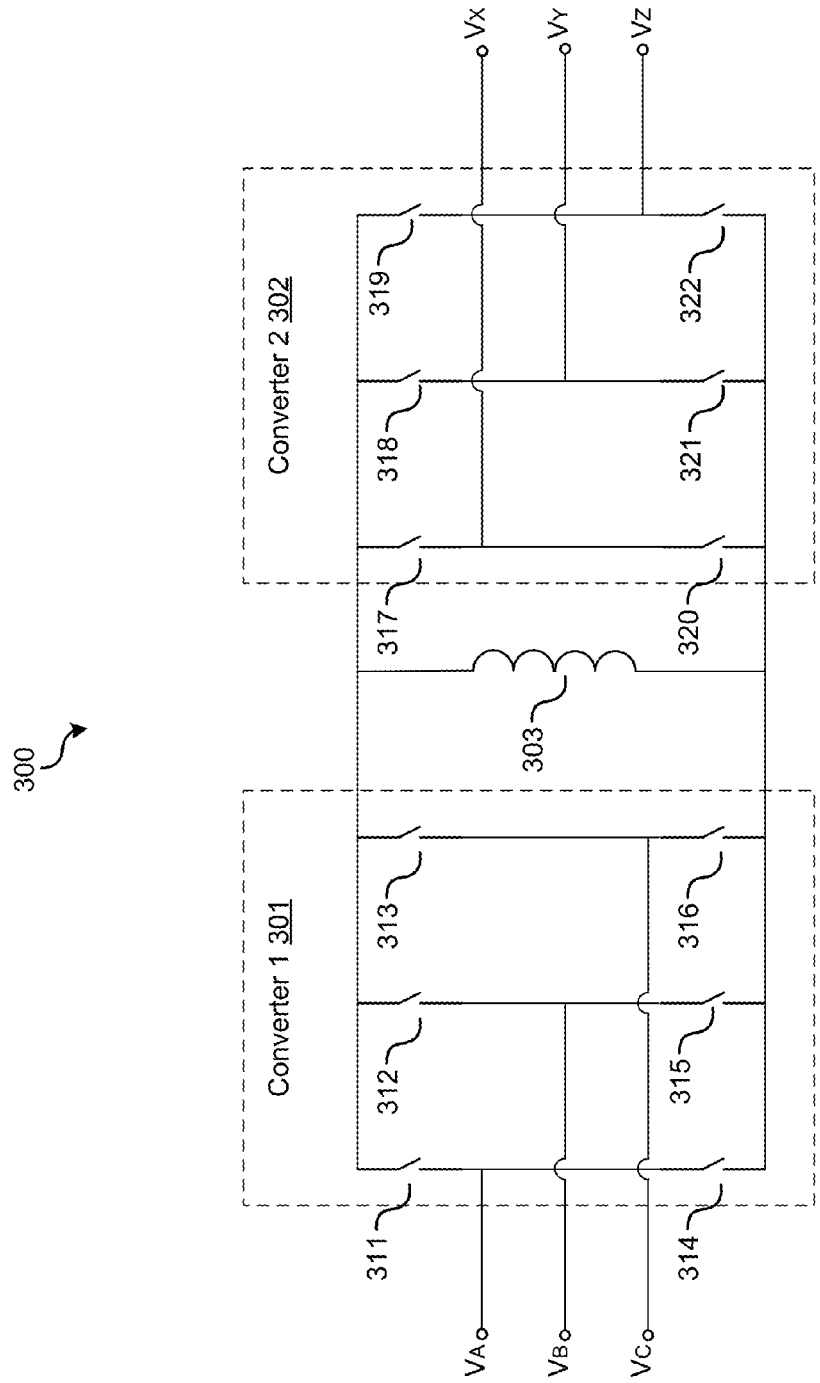
FIG. 3A is a simplified equivalent circuit diagram of a Dyna-C solid state transformer in accordance with an embodiment.

FIG. 3A is a simplified equivalent circuit diagram of a Dyna-C solid state transformer 300 in accordance with an embodiment. The converter 301 comprises switches 311-316 and the converter 302 comprises switches 317-322. In various embodiments, the switches 311-322 are two-quadrant switches, that conduct current in only one direction but block voltage in both directions. The inductor 303 represents the transformer's magnetizing inductance. In various embodiments, the solid state transformer may function similar to a flyback converter operating with zero leakage inductance, where the magnetizing DC current is maintained and the desired input to output power transfer is achieved through duty cycle modulation control. The converter 301 is the primary converter and the converter 302 is the secondary converter. The primary converter 301 and the secondary converter 302 alternate their operation, with their respective time period given by: $T_p$ and $T_n$. The total period T is the sum of the two periods: $T=T_p+T_n$.

As the voltages and currents of the three phases can be assumed to be balanced in certain applications, as a result, $V_a+V_b+V_c=0$ and $I_a+I_b+I_c=0$. Additionally, the control reference currents are also balanced: $I^*_a+I^*_b+I^*_c=0$. In turn, out of the three balanced phase voltages and currents, two voltages and currents have the same polarity and the other one has the opposite polarity and higher magnitude. When the primary converter 301 operates, a line-line voltage is imposed across the inductor 303. Accordingly, for each phase, the average current depends on the inductor current $I_L$ and the effective duty cycle of the corresponding switch(es).

Take phase A for example: the average current for phase A, $I_A$, depends on the inductor current $I_L$ and the effective duty cycle $$D_a \left( D_a = \frac{t_a}{T_p + T_n} \right).$$

Depending on whether the switch 311 or 314 is on during the period $t_a$, the average current for phase A, $I_A$, may be positive or negative:

$$I_A = I_L \left( \frac{t_a}{T_p + T_n} \right)$$

or $$I_A = -I_L \left( \frac{t_a}{T_p + T_n} \right).$$

Input and output waveforms can be described by the duty cycle of the switches under the assumption of high-frequency synthesis where the converter period, T, is assumed to be significantly smaller than the duration of a single line cycle, or $$(T_p + T_n) << T_{line} = \frac{1}{f_{line}}.$$

Therefore, the described duty cycle averaging techniques may be applied.

Device stresses can be seen to be $I_L$ for the peak current, and the peak of the line-line voltage, while the maximum conduction time for each switch is 60°. In further embodiments, a second set of converters and transformers may be included to reduce ripple currents in the input and output capacitors. In one embodiment, the two converters may be operating with a phase shift of 180°. As a result, the ripples generated from each converter have a phase shift of 180° and cancel out with each other. Furthermore, such paralleling approaches can also be used to increase power ratings.

Figure 3B:
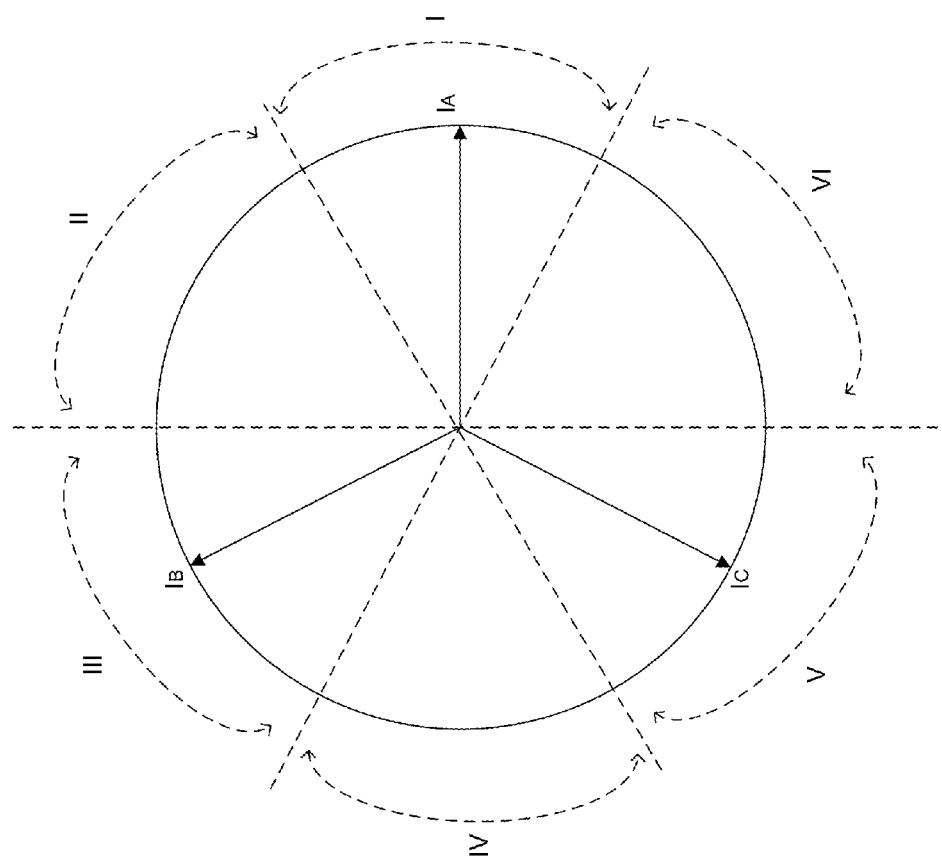
FIG. 3B is a sector diagram illustrating the space vector modulation (SVM) based control and the operation of a dynamic current solid state transformer in accordance with an embodiment.

FIG. 3B is a sector diagram illustrating the space vector modulation (SVM) based control and the operation of a dynamic current solid state transformer in accordance with an embodiment. In the illustrated example, each segment is defined for the input current reference i*. In segment I, the reference current's magnitude $|i_A^*|$ is maximum and $i_A^* > 0$. Referring back to FIG. 3A, for the time period $T_p$, the switch 311 is on, the switch 315 is on for $t_1$, and the switch 316 is on for $t_2$. Accordingly, the reference current for each phase is:

$$i_A^* = I_L \left( \frac{t_1 + t_2}{T_t} \right),$$

$$i_B^* = -I_L \left( \frac{t_1}{T_t} \right),$$

and $$i_C^* = -I_L \left( \frac{t_2}{T_t} \right),$$

where $T_p = t_1 + t_2 + t_{Z1}$, $T_n = t_3 + t_4 + t_{Z2}$, $T_p + T_n = T_t$, and where $t_{z1}$ and $t_{z2}$ are free-wheeling time when zero voltage is applied across the inductor. With further reference to FIG. 3B, for segment I, depending on the line voltages $V_{ab}$ and $V_{ac}$, the voltage vector applied to the inductor L is $V_{Lp}^* T_p = V_{ab}^* t_1 + V_{ac}^* t_2 + 0^* t_{Z1}$. Whether $V_{ab}$ occurs first or $V_{ac}$ or $V_Z$ depends on the commutation sequence, losses, etc. Assuming that the power is flowing from left to right, this operation may be referenced to as the "charging cycle."

The converter 302 is switched for the "discharging cycle." Accordingly, the reference output current for each phase is:

$$i_X^* = I_L \left( \frac{t_3 + t_4}{T_t} \right),$$

$$i_Y^* = -I_L \left( \frac{t_3}{T_t} \right),$$

$$i_Z^* = -I_L \left( \frac{t_4}{T_t} \right),$$

assuming $|i_x| > |i_y|$ and $|i_x| > |i_z|$ and the three phases are balanced. Further, $V_{Ln}^* T_n = V_{XY}^* t_3 + V_{XZ}^* t_4 + 0^* t_{Z2}$. If the inductor current is constant, then $(V_t)_{Lp}^* T_p = (V_t)_{Ln}^* T_n$ and all input energy is delivered to output.

Moreover, by making $V_{Lp}^* T_p \neq V_t^* T_n$, the inductor current may be increased or decreased at will. The input and output voltages, the frequency and the power factor may be different. However, if $I_L$ is maintained constant, the energy drawn from the input equals to the energy delivered to the output over one cycle. Accordingly, $V_{Lp}^* T_p$ and $V_{Ln}^* T_n$ are also the main control factors to ensure that the transformer (represented by the inductor 303 in FIG. 3A) does not saturate. The device switching in the converter 301 and converter 302 is coordinated such that the current transfers naturally between the two converters, thereby mitigating the effect of energy trapped in the leakage inductance of the transformer. The current transfers naturally when the commutation between bridges are not forced or hard switched. The leakage current of the outgoing bridge and of the incoming bridge are constantly monitored and managed to achieve the natural transfer. In various embodiments, the transfer of currents between the converters is based on a voltage-driven commutation, driven by the applied voltage(s) on the "DC" bus between the two converters 301 and 302.

Some embodiments may be implemented in applications where the load currents of the three phases are not balanced. As illustrated in FIGS. 2A, the Dyna-C solid state transformer 200 comprises four legs instead of three legs. The four-wire topology allows the neutral current to return through the fourth leg. Accordingly, $I_a + I_b + I_c = -I_{neutral}$. In certain embodiments, the references for generating these currents are based on keeping the output three-phase voltages balanced and well regulated. The syntheses of the three unbalanced currents are based on the same principle as the balanced case where the DC magnetizing current is pulsed across each phase such that reference charge balances are satisfied across each respective phase.

At any instant in time, the currents in the four wires can take on one of two qualities: 1) one current is of one polarity and has the highest magnitude while the other three currents are of opposite polarities, of 2) two currents are of one polarity with one of them having the highest magnitude, and the other two current are of opposite polarity. Depending on which instant in time the control is operating over, the four currents in four wires may have different polarities and magnitudes as they vary sinusoidally. Hence, while the subscript denoting phase variables may change, these two categories of relationship remain true.

In one embodiment, one current is of one polarity and has the highest magnitude while the other three current are of opposite polarities. Control is similar to the balanced case except for the additional phase where $$i_X *= I_L\left(\frac{t_3 + t_4 + t_5}{T_t}\right),$$

$$i_Y *= -I_L\left(\frac{t_3}{T_t}\right),$$

$$i_Z *= -I_L\left(\frac{t_4}{T_t}\right),$$

$$i_N *= -I_L\left(\frac{t_5}{T_t}\right),$$

assuming $|i_X|>|i_Y|$, $|i_X|>|i_Z|$, $|i_X|>|i_N|$, $|i_Y|>|i_Z|$ and $|i_Y|>|i_N|$.

In one embodiment, two currents have the same polarity with one of them having the highest magnitude, and the other two currents have the opposite polarity. The references currents may be given:

$$i_X *= I_L\left(\frac{t_3 + t_4}{T_t}\right),$$

$$i_Y *= -I_L\left(\frac{t_3}{T_t}\right),$$

$$i_Z *= -I_L\left(\frac{t_4 + t_5}{T_t}\right),$$

$$i_N *= I_L\left(\frac{t_5}{T_t}\right),$$

assuming $|i_X|>|i_Y|$, $|i_X|>|i_Z|$, $|i_X|>|i_N|$, $|i_Y|>|i_Z|$ and $|i_Y|>|i_N|$.

Figure 3C:
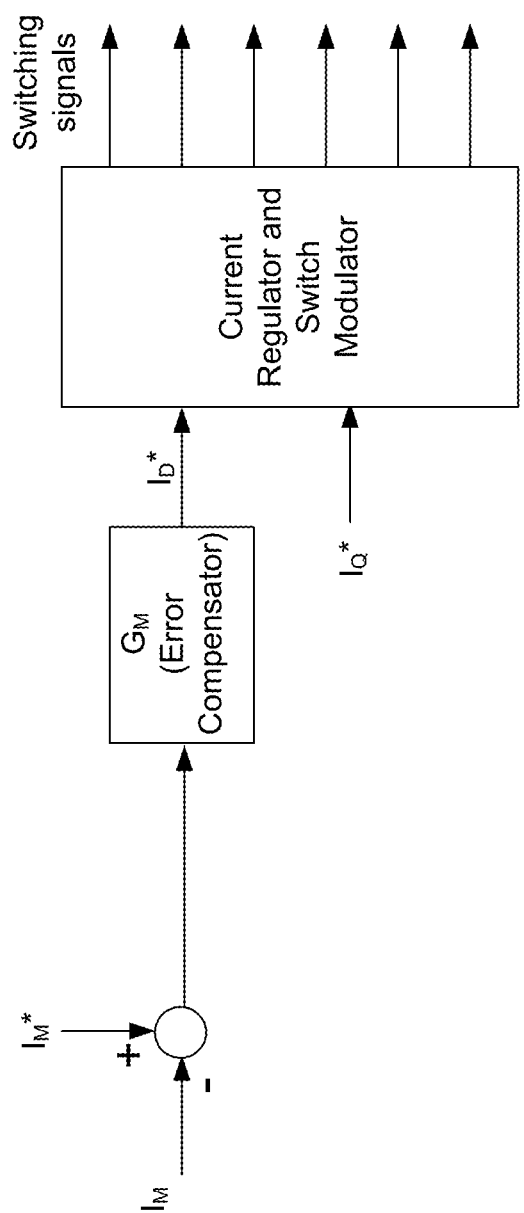
FIG. 3C is an exemplary input control diagram illustrating a method of controlling a Dyna-C converter in accordance with an embodiment.

FIG. 3C is an exemplary input control diagram illustrating a method of controlling a Dyna-C converter in accordance with an embodiment. Various switching signals are generated to control the magnetizing current of the transformer. The method regulates the magnetizing current with the direct (D) component of the input current.

Figure 3D:
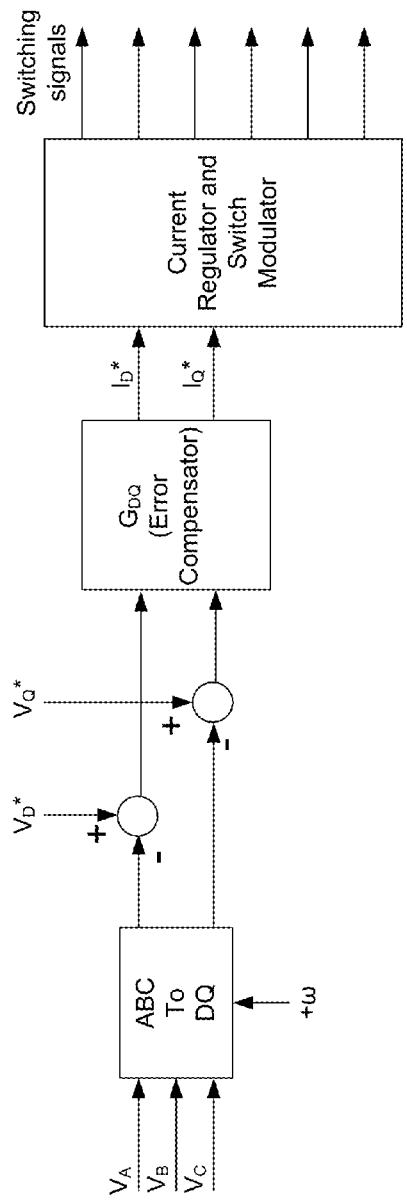
FIG. 3D is an exemplary output voltage control diagram under a balanced loading illustrating a method of controlling a Dyna-C converter in accordance with an embodiment.

FIG. 3D is an exemplary output voltage control diagram under a balanced loading illustrating a method of controlling a Dyna-C converter in accordance with an embodiment. Various switching signals are generated to control the output voltage for balanced loading.

Figure 3E:
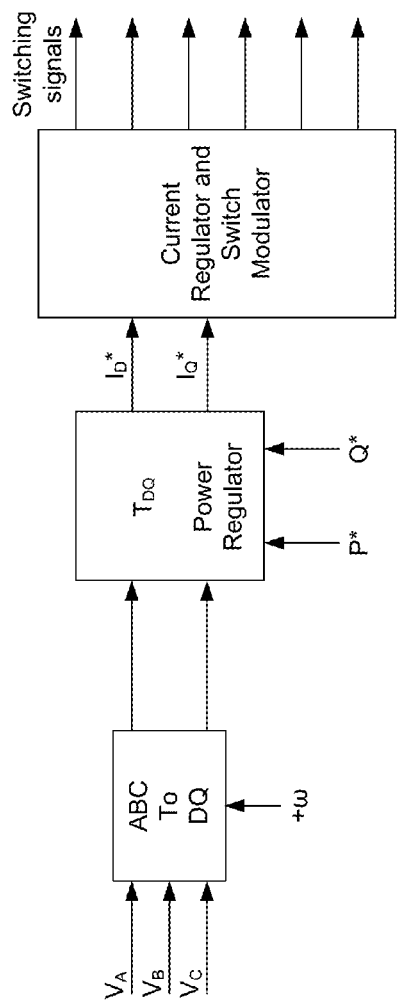
FIG. 3E is an exemplary output power control diagram under a balanced loading illustrating a method of controlling a Dyna-C converter in accordance with an embodiment.

FIG. 3E is an exemplary output power control diagram under a balanced loading illustrating a method of controlling a Dyna-C converter in accordance with an embodiment. Various switching signals are generated to control the output power for balanced loading.

Figure 3F:
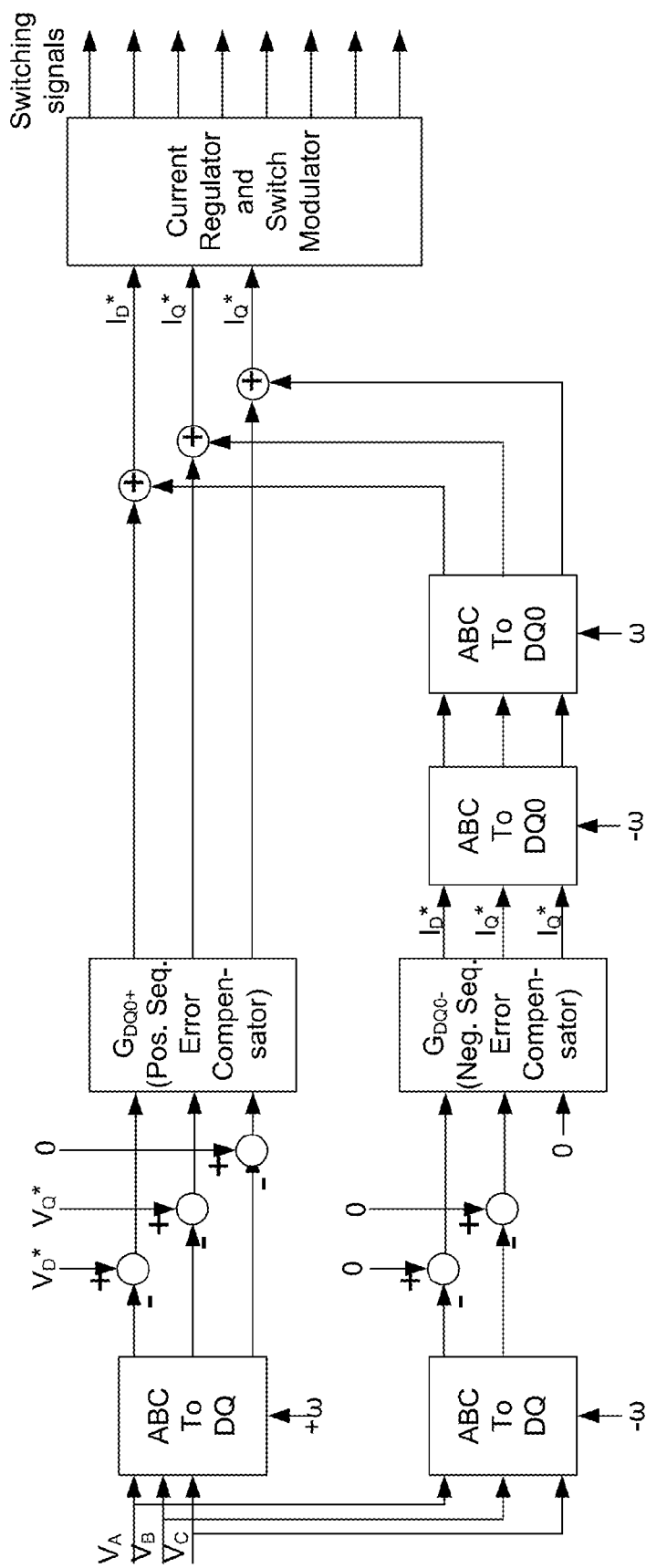
FIG. 3F is an exemplary output voltage and power control diagram under an unbalanced loading illustrating a method of controlling a Dyna-C converter in accordance with an embodiment.

FIG. 3F is an exemplary output voltage and power control diagram under an unbalanced loading illustrating a method of controlling a Dyna-C converter in accordance with an embodiment. Various switching signals are generated to control the output voltage and output power for unbalanced loading.

Figure 4:
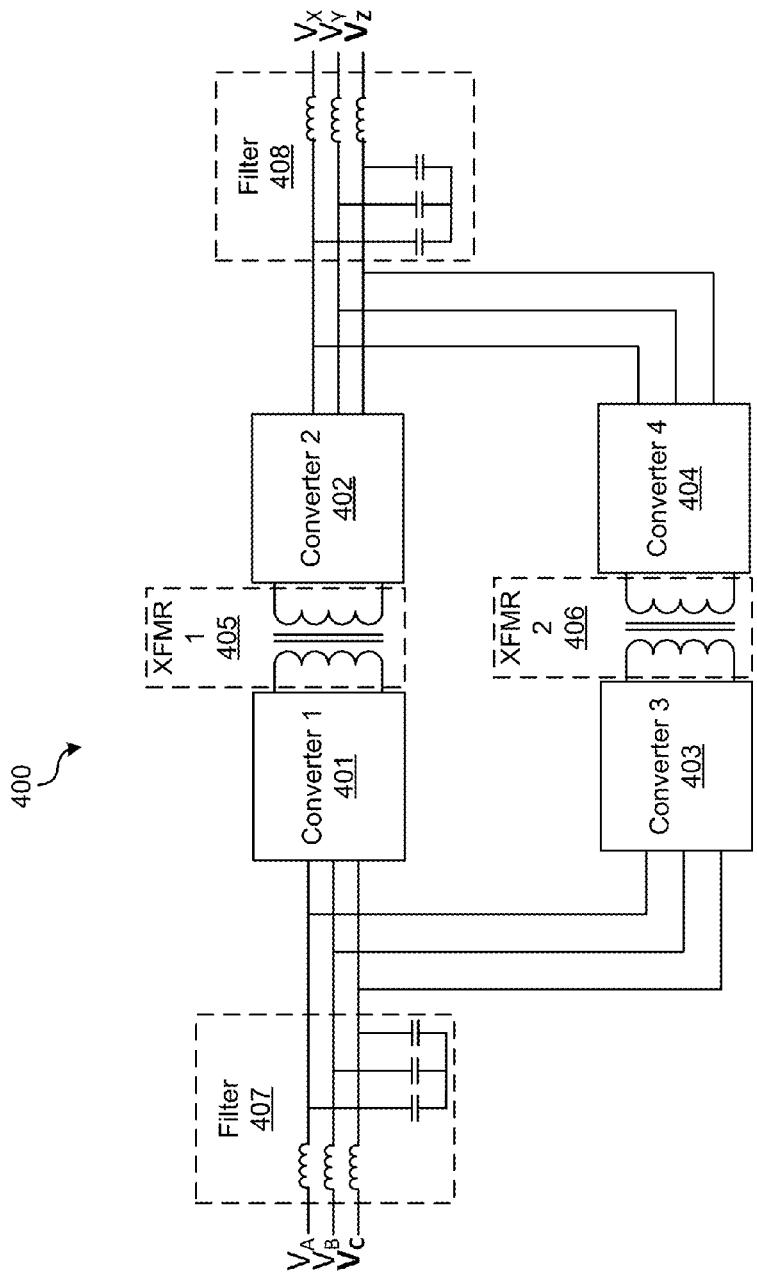
FIG. 4 is a diagram illustrating a Dyna-C solid state transformer in accordance with an embodiment.

FIG. 4 is a diagram illustrating a Dyna-C solid state transformer 400 in accordance with an embodiment. The illustrated example comprises four converters 401-404, transformers 405-406, and filters 407-408. Each converter may comprise six switches. In one embodiment, one switch is implemented by an IGBT. In the illustrated example, the solid state transformer 400 has a three-phase AC input and a three-phase AC output. In further embodiments, the solid state transformer 400 may be configured to have DC output. As illustrated, there are fewer series connected devices and lower voltage drops with higher efficiency, resulting in lower losses.

The Dyna-C solid state transformer 400 may comprise a control module (not shown) controlling the operation of the solid state transformer 400, for example, regulating the duty cycles of converters 401-404, and performing the leakage management.

Figure 5:
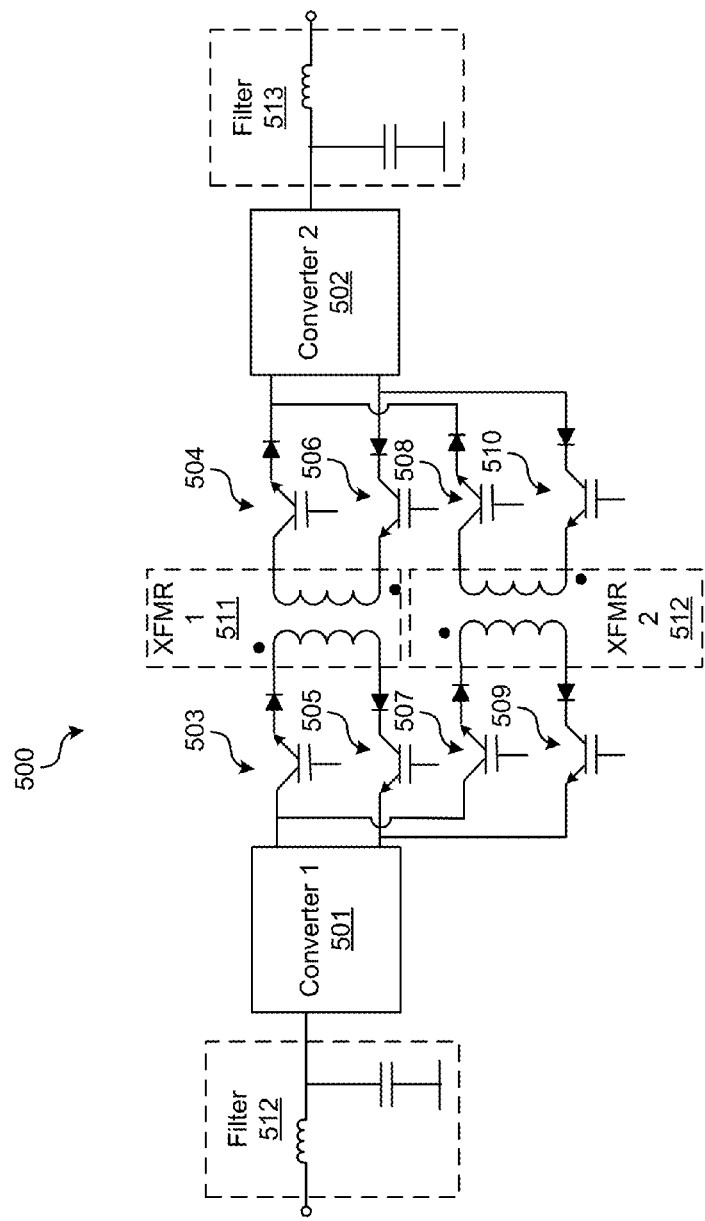
FIG. 5 is a diagram illustrating a Dyna-C solid state transformer in accordance with an embodiment.

FIG. 5 is a diagram illustrating a Dyna-C solid state transformer 500 in accordance with an embodiment. The illustrated example comprises converters 501 and 502, switches 503-510, and transformers 511-512. The switches comprised in the converters 501-502 and the switches 503-510 may be implemented by IGBTs. The solid state transformer 500 may have an AC input, an AC output or a DC output. The Dyna-C solid state transformer 500 may comprise a control module (not shown) controlling the operation of the solid state transformer 500, for example, regulating the duty cycles of converters 501-502, the switching of the switches 503-510, and performing the leakage management.

Figure 6:
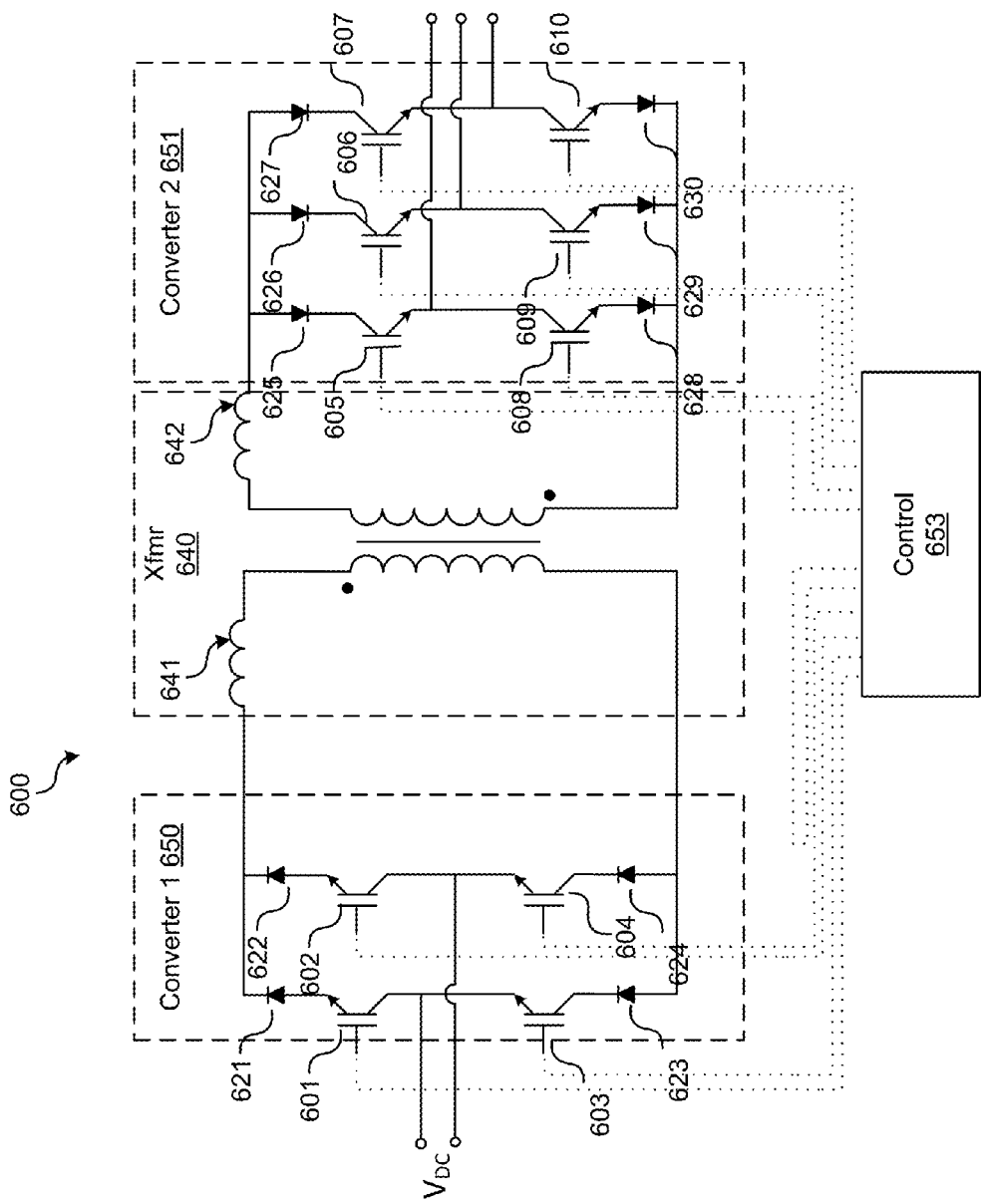
FIG. 6 is a diagram illustrating a Dyna-C DC-AC converter in accordance with an embodiment.

FIG. 6 is a diagram illustrating a Dyna-C DC-AC converter 600 in accordance with an embodiment. The illustrated example converts DC energy into AC energy and may be coupled to a battery, such as in an energy warehouse. The illustrated example comprises two converters 650 and 651, a transformer 640, and a control module 653. The equivalence of the leakage inductance of the transformer 640 is illustrated as inductors 641-642. Each converter 650 or 651 comprises a set of switches and diodes. No electrolytic capacitors are included and fast response is provided. Various embodiments provide energy warehouse functions with independent control over active and reactive power, which may be achieved through control of the grid-connected converter using P/Q control techniques. One embodiment may be paralleled at 480V and three-phase to reach the multi-MW level. Further, various embodiments may implement a multiport converter. The control module 653 may control the operation of the DC-AC converter 600, for example, regulating the duty cycles of converters 650-651, and performing the leakage management.

Figure 7A:
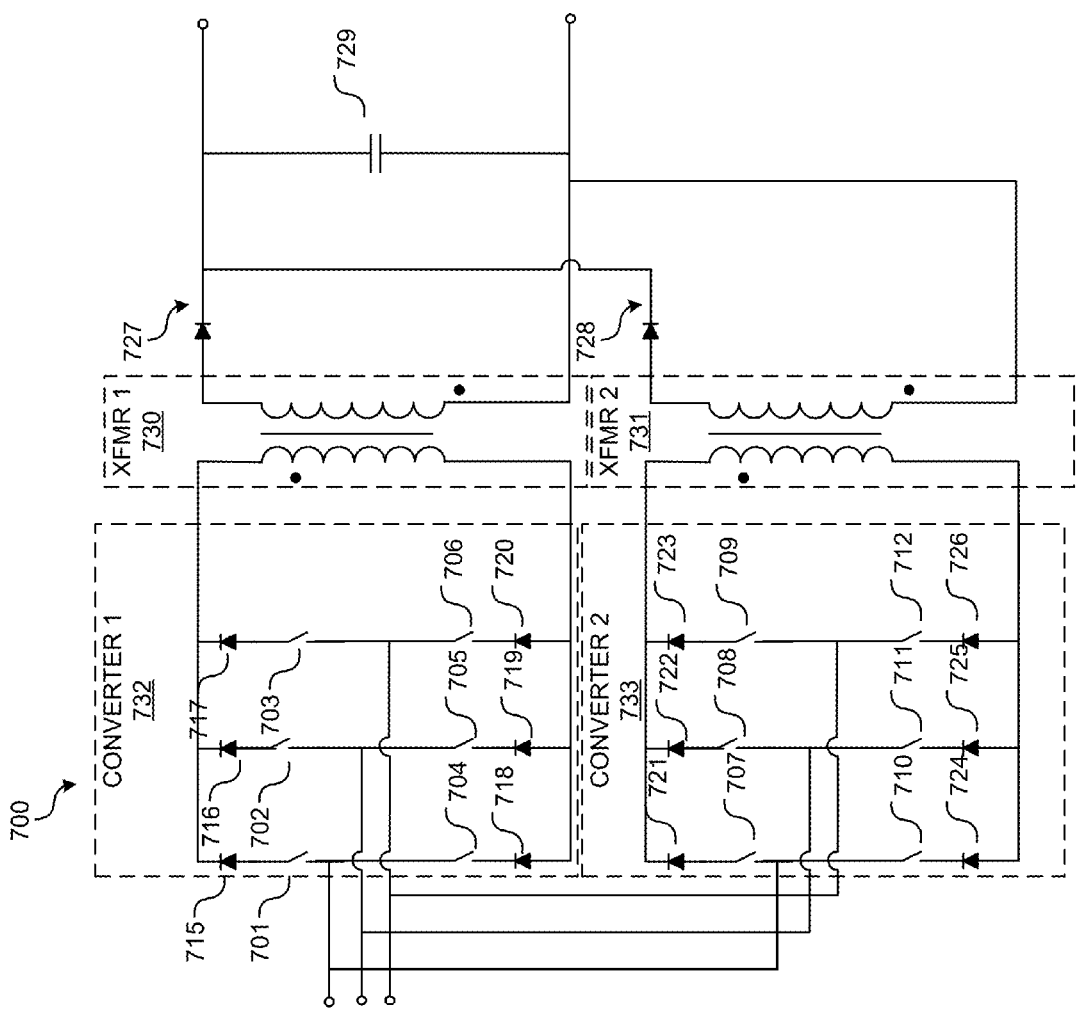
FIG. 7A is a diagram illustrating a Dyna-C DC power supply in accordance with an embodiment.

FIG. 7A is a diagram illustrating a Dyna-C DC power supply 700 in accordance with an embodiment. Applications like electroplating, electrowinning, and large energy storage systems need DC supplies with large currents. Typically, the current is between 300 to 10,000 Amp, and the voltage may vary between 12 to 200 Volts. The illustrated example may comprise a converter 732 comprising switches 701-716 and diodes 715-720, a converter 733 comprising switches 707-712 and diodes 721-726, transformers 730-731, diodes 727-728, and an output filter 729. In various embodiments, phase-staggering may be implemented by operating the converter 732 and the converter 733 in an overlap mode. As such, the output filter capacitor 729 does not have much ripple because the ripple of the currents through the diodes 727 and 728 are 180° phase shifted. In one embodiment, by adjusting the current $I_{DC}$, which is in the transformer magnetizing current, the input power factor, and the frequency to achieve the duty cycle of both converters 732 and converter 733 to 0.5, the voltage on the output capacitor 729 can result in the minimum ripple through phase staggering. Transformers 730 and 731 may be implemented with a Coaxial Wound Transformer (CWT) that provide ultra low leakage inductance and large cooling effects. In one embodiment, the output capacity is 48V/2000 A. The Dyna-C DC power supply 700 may comprise a control module (not shown) controlling its operation, for example, regulating the duty cycles of converters 732-733, and performing the leakage management.

Figure 7B:
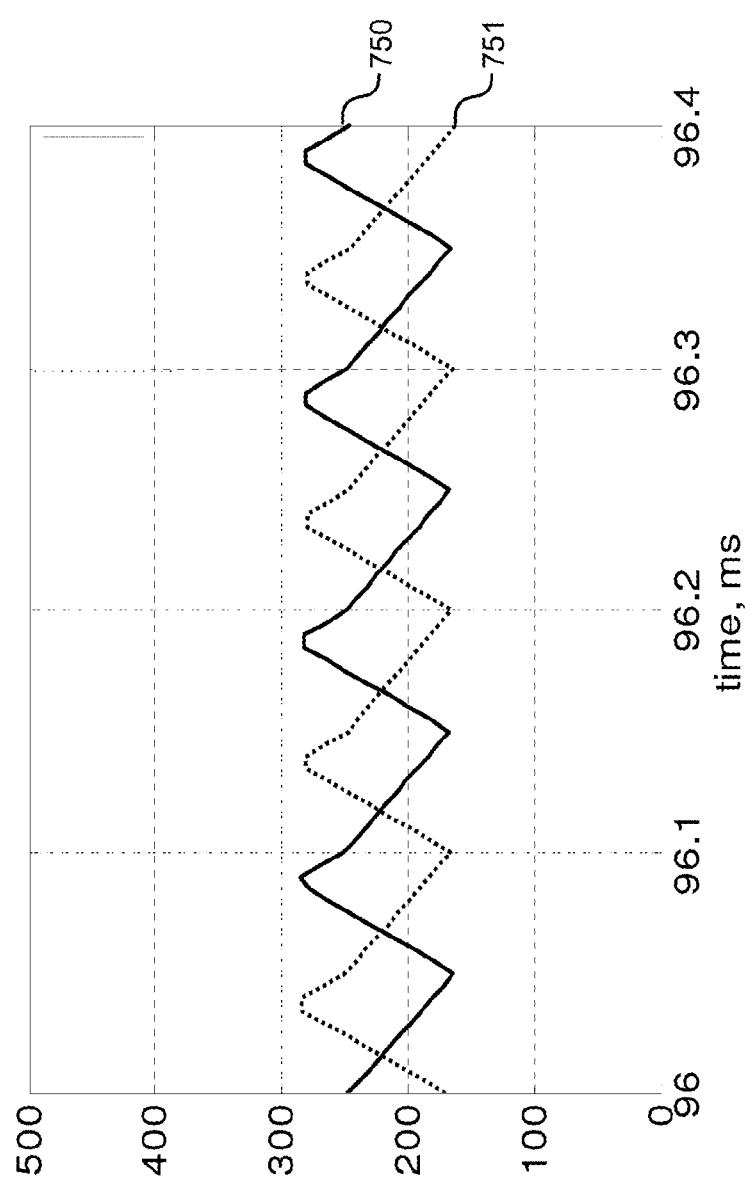
FIG. 7B are simulation waveforms illustrating operating two Dyna-C converters in parallel with a 180° phase staggering.

FIG. 7B are simulation waveforms illustrating operating two Dyna-C converters in parallel with a 180° phase staggering. Waveform 750 illustrates the magnetizing current of a converter, and waveform 751 illustrates the magnetizing current of the other converter. As illustrated, the two magnetizing currents have the same amplitude but opposite phases.

Figure 8A:
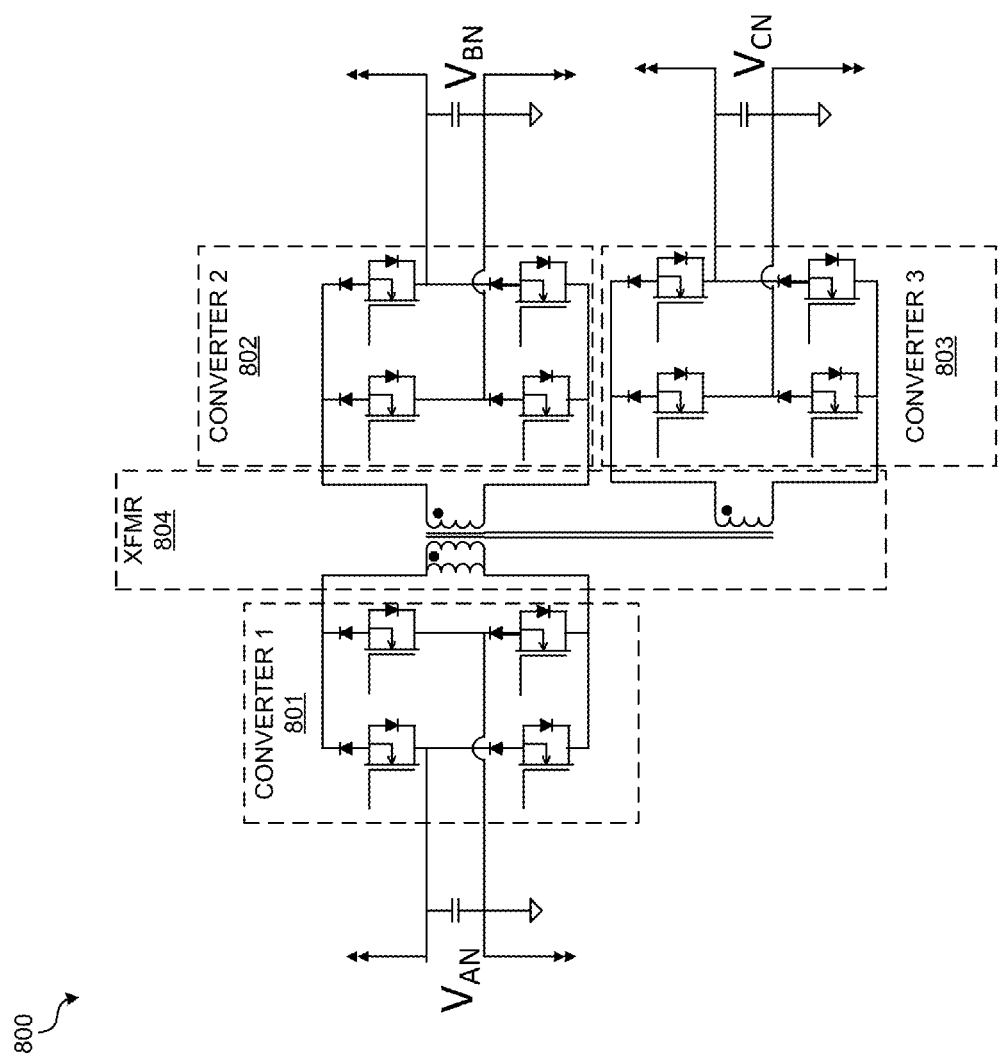
FIG. 8A is a diagram illustrating a stackable Dyna-C Dynamic VAR Compensator (DVC) in accordance with an embodiment.

FIG. 8A is a diagram illustrating a stackable Dyna-C Dynamic VAR Compensator (DVC) 800 in accordance with an embodiment. The illustrated DVC 800 comprises converters 801-803 and a transformer 804. In the illustrated example, the transformer 804 comprises three windings, and each of the converters 801-803 is coupled to a winding of the transformer 804. Each converter may correspond to a phase. In the illustrated example, the converter 801 is coupled to phase A, the converter 802 is coupled to phase B, and the converter 803 is coupled to phase C. Each converter is a bridge of the DVC. Each phase uses an independent bridge but a common transformer 804 is shared among the three phases via three independent windings. Only one of the bridges conduct current at any time, and 3-phase voltages having alternate polarities (+/−) allow DC flux in the core to be regulated (magnetizing current). For each DVR unit, the voltage is the phase voltage but the current needs to be controlled.

The DC current in the transformer (or may be illustrated as an inductor), $I_m$, is flowing as the magnetizing current, Accordingly, the currents for all three phases may be determined as:

$$i_a = D_a * I_m \text{ or } i_A = -D_a * I_m;$$

$$i_b = D_b * I_m \text{ or } i_b = -D_b * I_m;$$

$$i_c = D_c * I_m \text{ or } i_c = -D_c * I_m;$$

where $$\pm V_a D_a \pm V_b D_b \pm V_c D_c \pm 0 * (1 - D_a - D_b - D_c) = L_m \frac{\Delta I_m}{T}.$$

When multiple (for example, N) DVR units are series stacked, ΔV (=V/N) that is applied across each capacitor has to be controlled to ensure voltage sharing.

Figure 8B:
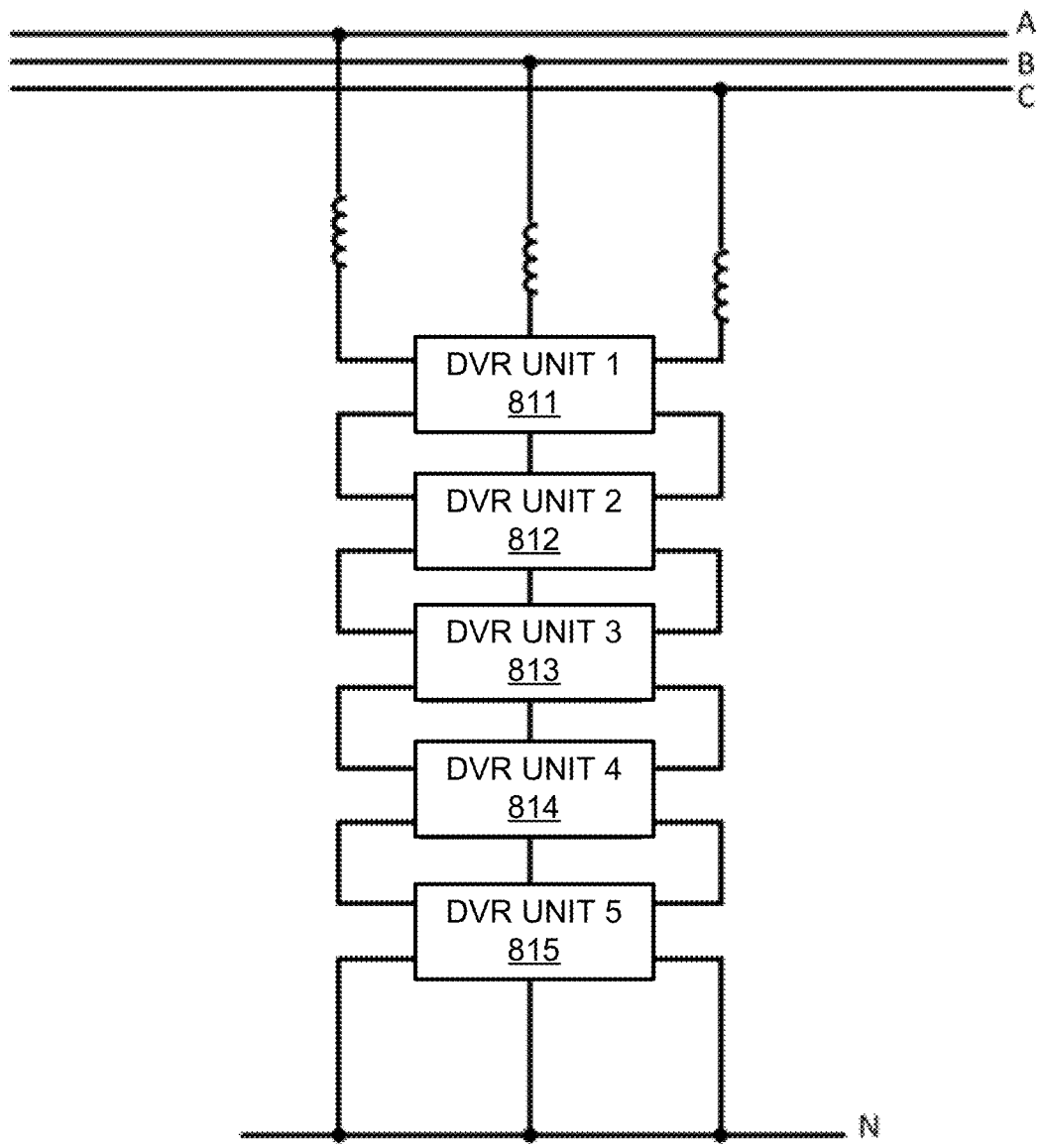
FIG. 8B is a diagram illustrating series stacking multiple Dyna-C DVC units.

The Dyna-C DVC 800 is suitable for series stacking to reach higher voltages. Each Dyna-C DVC unit may be built for a fixed voltage and power ratings. By series stacking multiple DVR units, medium voltages and higher power may be provided. By paralleling multiple modules, higher power without voltage scaling may be provided. An increased number of cascaded DVR units provide higher voltages and power. In various embodiments, the DVR units may be phase staggered for an improved current THD and lower capacitor ratings. The Dyna-C DVC 800 may comprise a control module (not shown) controlling its operation, for example, regulating the duty cycles of converters 801-803, and performing the leakage management. FIG. 8B is a diagram illustrating series stacking multiple Dyna-C DVC units. In the illustrated example, DVR units 811-815 are series cascaded. Each DVR unit may be a Dyna-C DVC as illustrated in FIG. 8A.

Figure 8C:
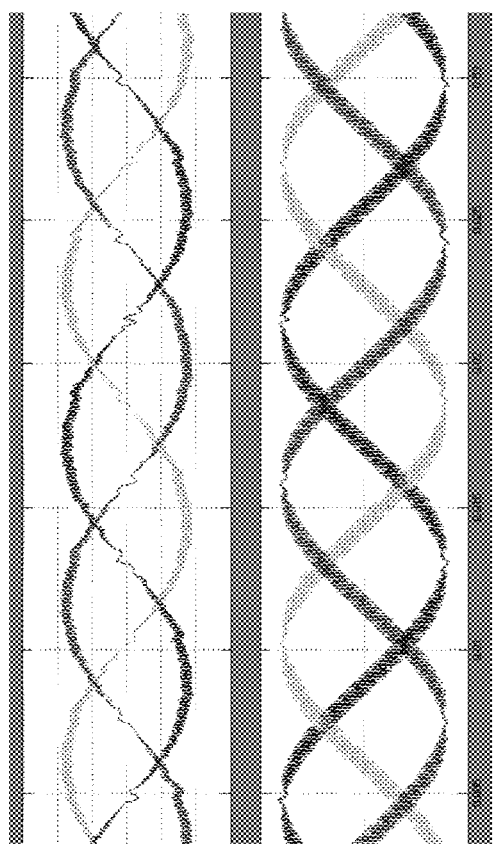
FIG. 8C are simulation waveforms of a Dyna-C DVC in accordance with an embodiment.
Figure 8D:
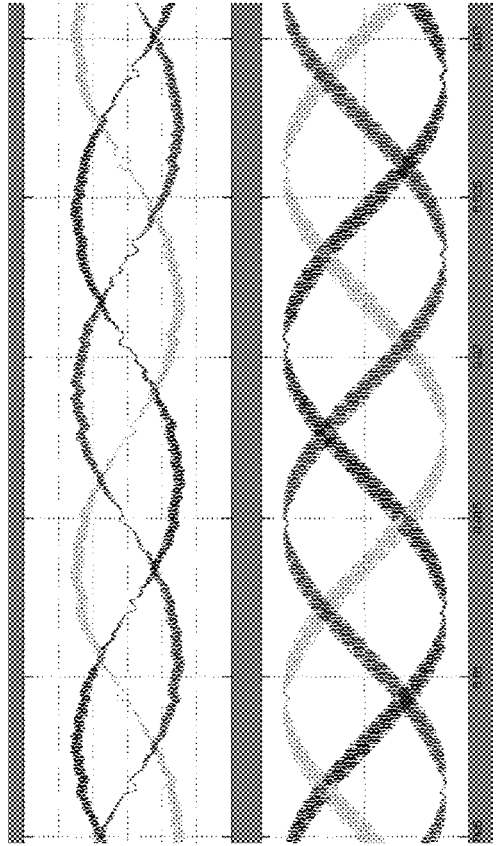
FIG. 8D are simulation waveforms of a Dyna-C DVC in accordance with an embodiment.

FIG. 8C are simulation waveforms of a Dyna-C DVC in accordance with an embodiment. Waveforms 820 are three phase currents, and waveforms 821 are three phase voltages. In the illustrated waveforms, a current is leading its corresponding voltage by 90 degrees. Each phase current comprises a reactive component that is used for VAR compensation and an active component to compensate for converter losses. FIG. 8D are simulation waveforms of a Dyna-C DVC in accordance with an embodiment. Waveforms 822 are three phase currents, and waveforms 823 are three phase voltages. In the illustrated waveforms, a current is lagging its corresponding voltage by 90 degrees.

Figure 9A:
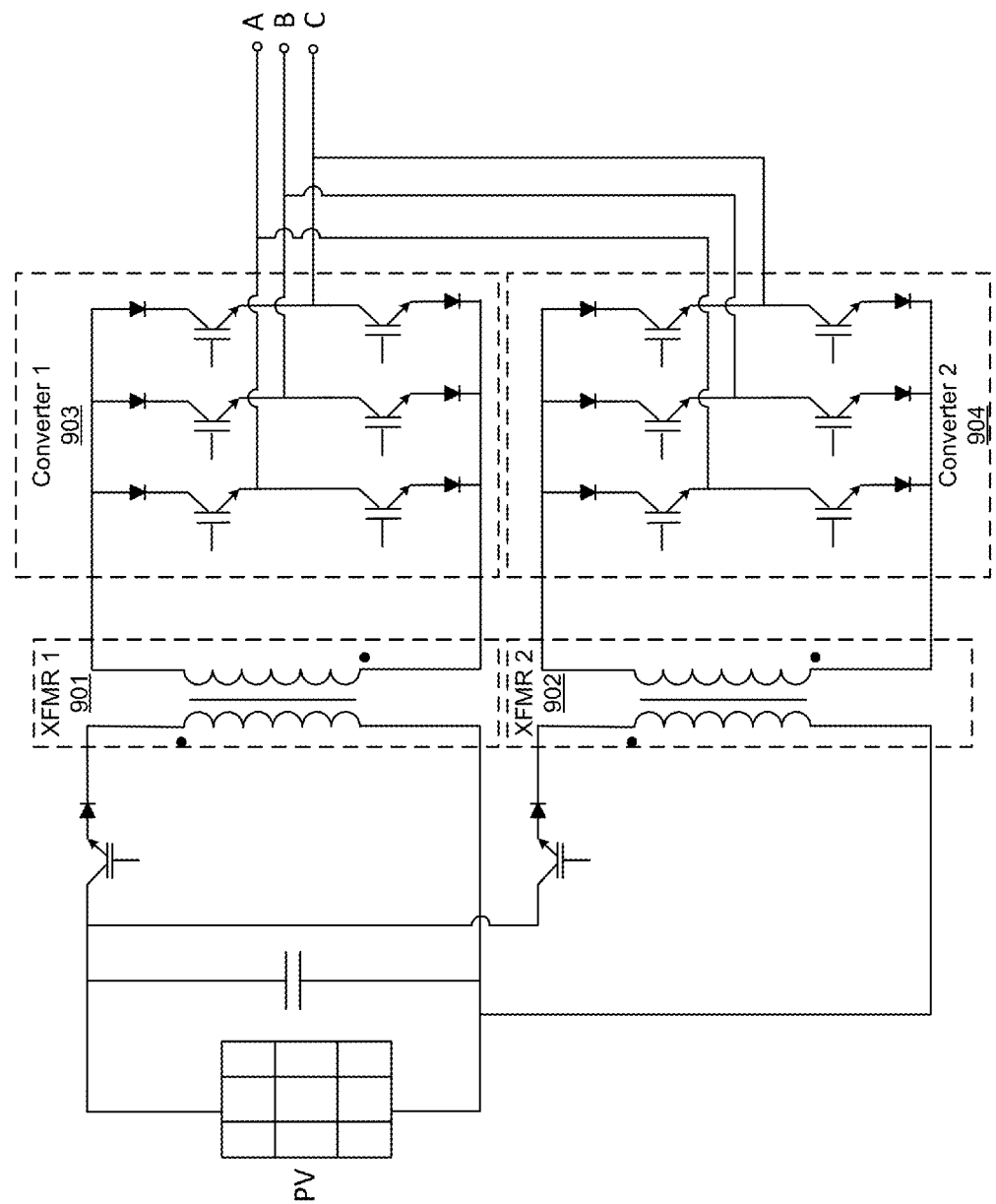
FIG. 9A is a schematic diagram illustrating a Dyna-C inverter in accordance with an embodiment.

FIG. 9A is a schematic diagram illustrating a Dyna-C inverter in accordance with an embodiment. The illustrated example comprises transformers 901-902 and converters 903-904. Various embodiments may provide DC/AC conversions for PV and other DC-Grid apparatus. Magnetizing currents in transformer 901 and transformer 902 have the same amplitude and at a value such that the duty cycle of the converter 903 D1, and the duty cycle of the converter 904 D2 are 0.5 but phase staggered by 180°, which eliminates the input ripple. These embodiments can be controlled to provide active power P and reactive power Q control. Maximum power point tracking (MPPT) implementation may also be provided. In further embodiments, a Dyna-C inverter may comprise an input filter comprising an inductor and a capacitor. In various embodiments, a Dyna-C inverter may comprise a control module (not shown) controlling its operation, for example, regulating the duty cycles of converters 903-904, and performing the leakage management.

Figure 9B:
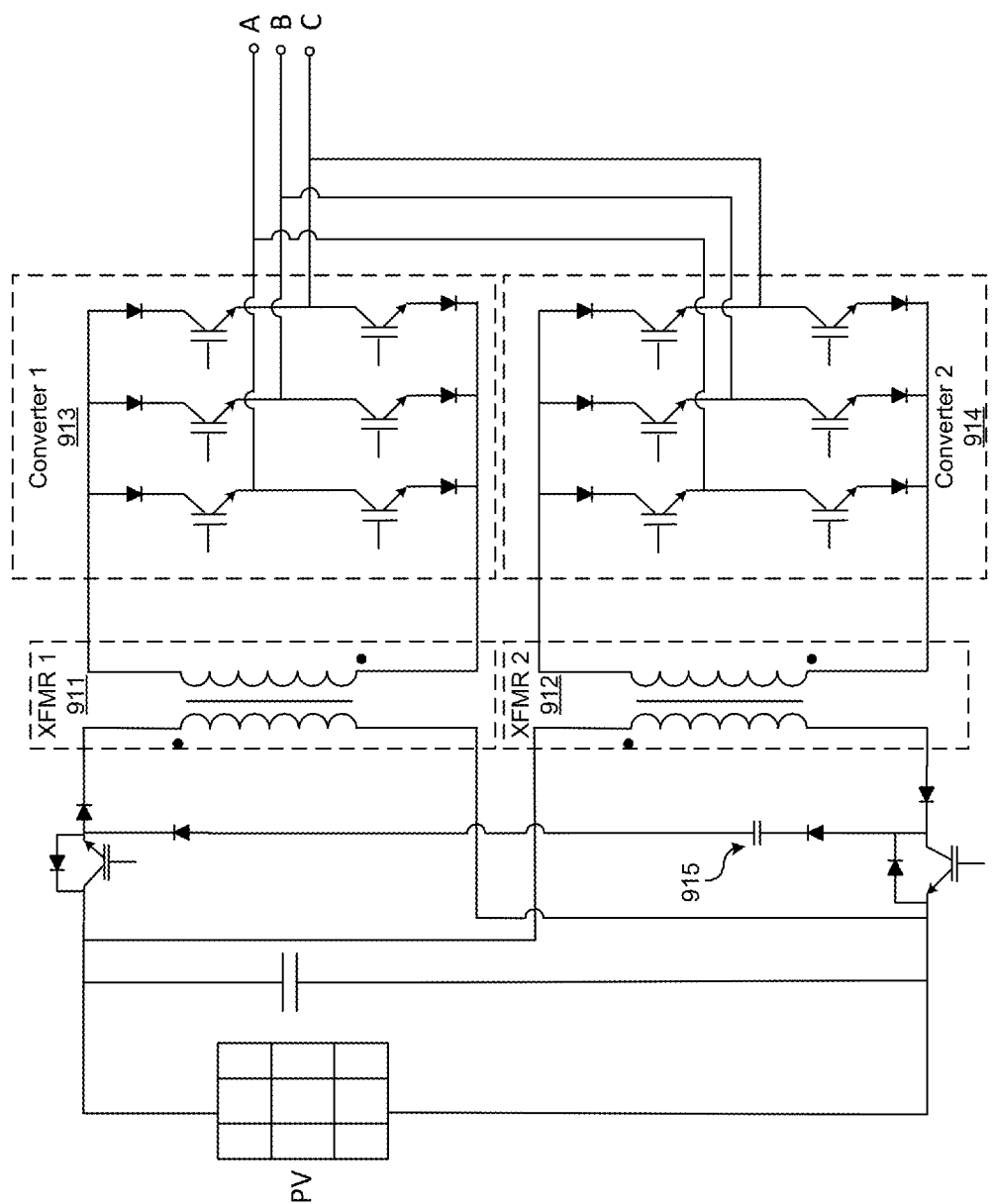
FIG. 9B is a schematic diagram illustrating a Dyna-C inverter in accordance with an embodiment.

FIG. 9B is a schematic diagram illustrating a Dyna-C inverter in accordance with an embodiment. The illustrated example comprises transformers 911-912, converters 913-914, and a capacitor 915. The trapped energy in the transformers 911 and 912 is transferred to the capacitor 915 automatically. A small flyback converter can recover most of that energy and cycle it back to the input DC voltage source comprised by the PV panel string, Vs. If the leakage inductance of the transformers 911 and 912 is low, the trapped energy can be low. In some embodiments, the series diodes are SiC. In various embodiments, a Dyna-C inverter may comprise a control module (not shown) controlling its operation, for example, regulating the duty cycles of converters 913-914, and performing the leakage management.

Figure 9C:
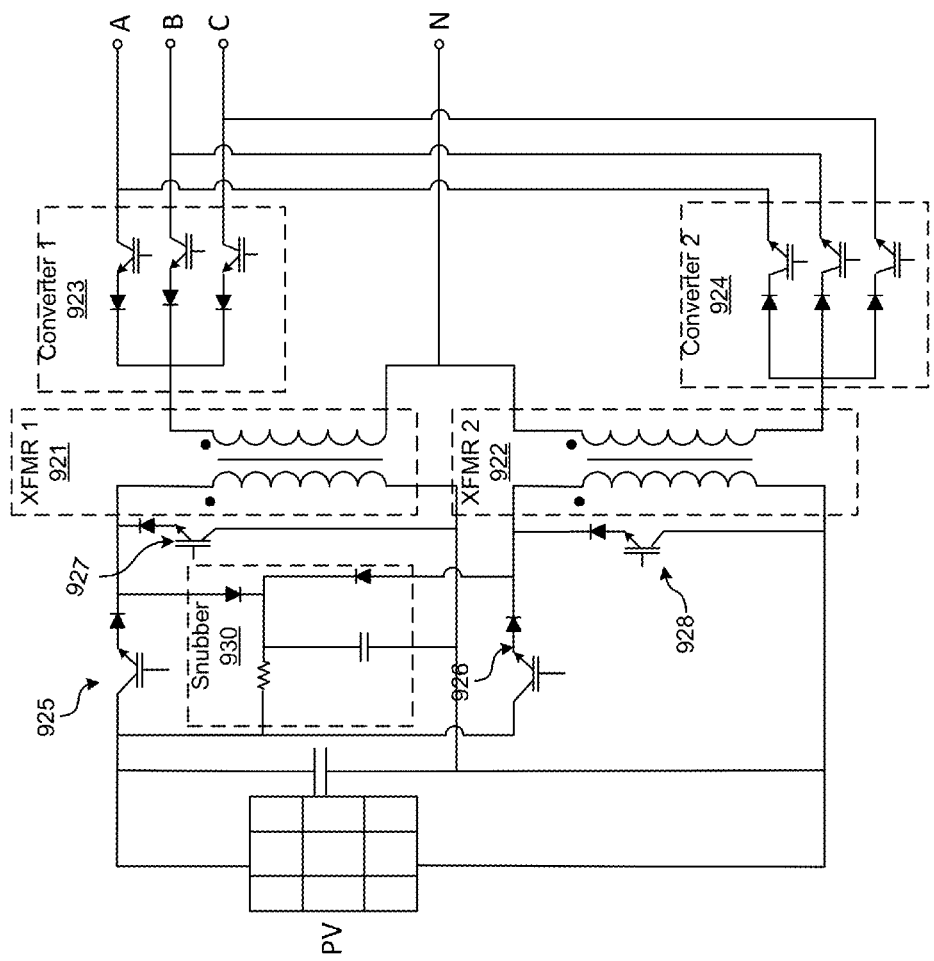
FIG. 9C is a schematic diagram illustrating a Dyna-C inverter in accordance with an embodiment.

FIG. 9C is a schematic diagram illustrating a Dyna-C inverter in accordance with an embodiment. The illustrated example comprises transformers 921-922, converters 923-924, input switches 925-926, and switches 927-928. The converter 924 is a plus converter and the converter 923 is a minus converter. The input switches $S_p$ 926 and $S_m$ 925 provide real power to the transformer magnetizing current, and make up power loss in the switches and transformer. In some embodiments, this energy loss could also be recovered from the AC side. The output AC side can synthesize current of any phase with respect to the corresponding phase voltage, thereby providing active and reactive power control. The plus converter 924 only synthesizes those phases that have positive current at a given instant of time, while the minus converter 923 synthesizes the negative phases. Each converter thus generates low order harmonics on the input DC side, which are in anti-phase with each other, so the net DC has no low order harmonics, in particular, the third harmonics. The switches 927 and 928 allow for free wheeling paths under fault, start up and shut down conditions, and also allow for implementation of the leakage management strategy. Only one switch conducts at any time on the primary and secondary side. As a result, conduction loss is reduced by half. Further, as $V_s$ and $-V_s$ voltages (and zero) are always available, switches 925 and 926 are turned on and turned off with low switching loss, working with the transformer leakage inductance to control the instantaneous current change over time (di/dt) to allow for zero current during turn on or off. In various embodiments, a small snubber 930 may be used to capture diode reverse recovery current (with stored energy in leakage). In various embodiments, a Dyna-C inverter may comprise a control module (not shown) controlling its operation, for example, regulating the duty cycles of converters 923-924, switching of the switches 925-926, and performing the leakage management.

Figure 9D:
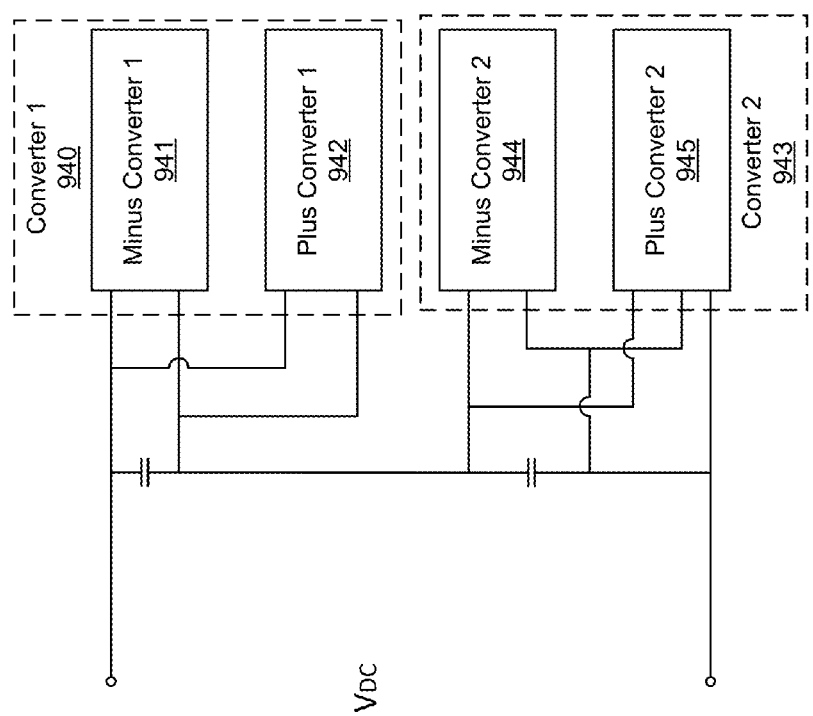
FIG. 9D is a diagram illustrating series stacking of Dyna-C inverters in accordance with an embodiment.

FIG. 9D is a diagram illustrating series stacking of Dyna-C inverters in accordance with an embodiment. The illustrated example comprises two converters 940 and 943, with their outputs coupled in parallel. The converter 940 comprises a minus converter 941 and a plus converter 942, and the converter 943 comprises a minus converter 944 and a plus converter 945. The minus converters 941 and 944 may be configured similarly to the converter 923 as illustrated in FIG. 9C and the plus converters 942 and 945 may be configured similarly to the converter 924 as illustrated in FIG. 9C. As large PV farms generate higher DC voltages, various embodiments may be modified in series stacking as illustrated in FIG. 9D. By stacking the same modules allows up to 1500V DC input with DC/AC energy delivered at a significantly lower loss because devices of lower voltage ratings may be used.

Figure 10A:
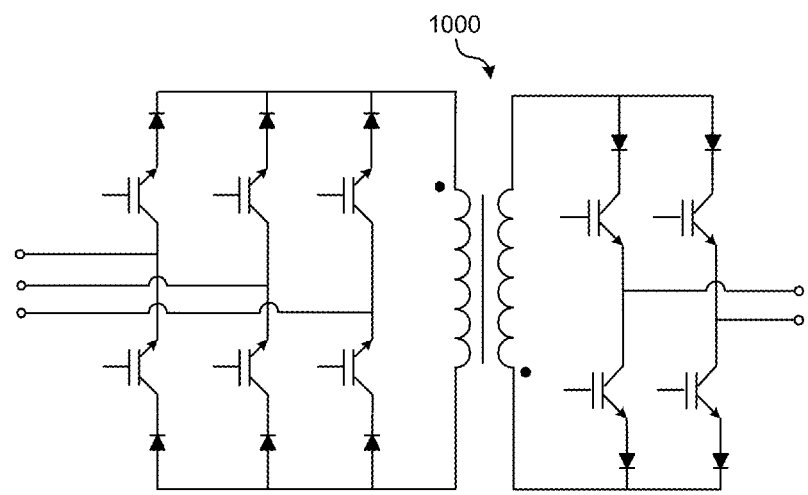
FIG. 10A is a diagram illustrating a low-voltage to medium-voltage solid state transformer unit in accordance with an embodiment.

FIG. 10A is a diagram illustrating a low-voltage to medium-voltage solid state transformer unit 1000 in accordance with an embodiment. The illustrated example converts a low-voltage three-phase AC input into either a single-phase AC output or DC output. Multiple embodiments may be implemented in parallel on the low voltage side and connected in series on the high voltage side.

Figure 10B:
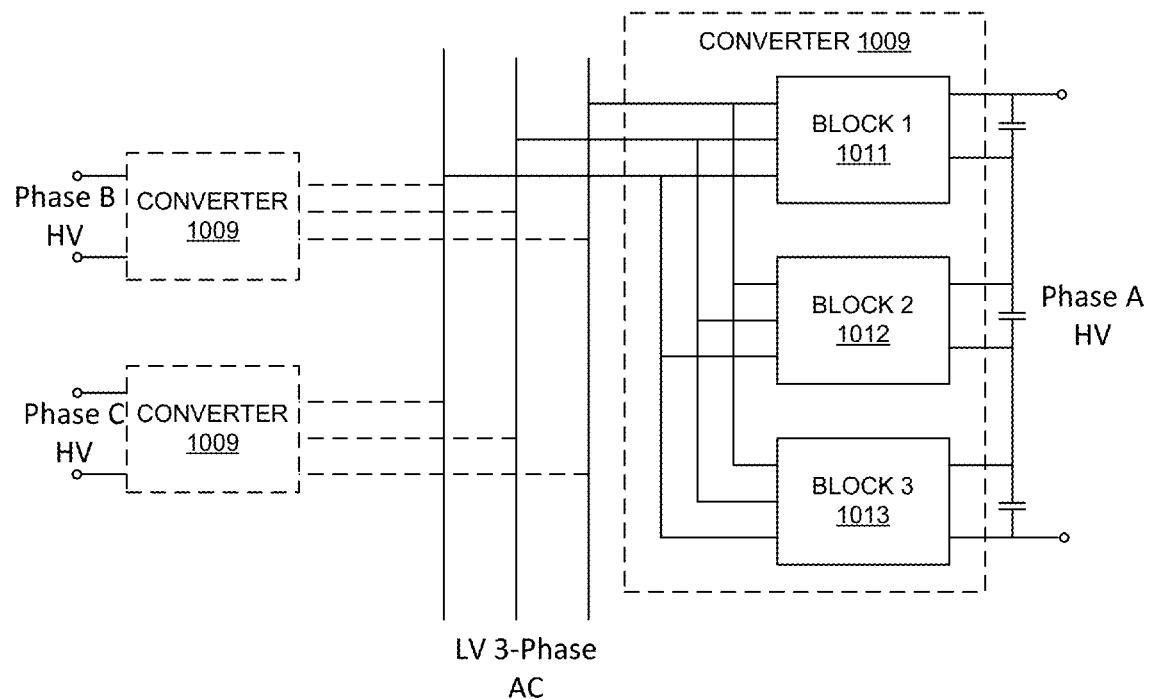
FIG. 10B is a diagram illustrating a three-phase dynamic current medium voltage solid state transformer in accordance with an embodiment.

FIG. 10B is a diagram illustrating a three-phase dynamic current medium voltage solid state transformer in accordance with an embodiment. As illustrated, three dynamic current building blocks 1011-1013 are paralleled on the low voltage side and connected in series on the high voltage side. Each of the blocks 1011-1013 may be configured similar to the Dyna-C medium voltage solid state transformer unit 1000 as illustrated in FIG. 10A. One of ordinary skill in the art would appreciate that three units are shown in series in FIG. 10B, but more units may be used as needed. The magnetizing current can be maintained to compensate for losses through any of the three phases (even when one of the other phase voltage is 0). Overall, the balanced operation is achieved. Voltage sharing on the one-phase side is with low instantaneous rate of voltage change over time (dv/dt) due to the presence of the filter capacitor (e.g., dv/dt is roughly 1.5 V/µs). This allows for each stage to easily track voltage independently, dynamically and robustly. The maximum $\Delta v$ switched is limited to a single device rating—so Electromagnetic Interference (EMI) is much lower. Stress on the insulation is also lowered, as most of the electric field is at low frequency, and only $\Delta v$ is switched at a time. In further embodiments, phase staggering on input and output may be implemented to further reduce harmonics.

Figure 10C:
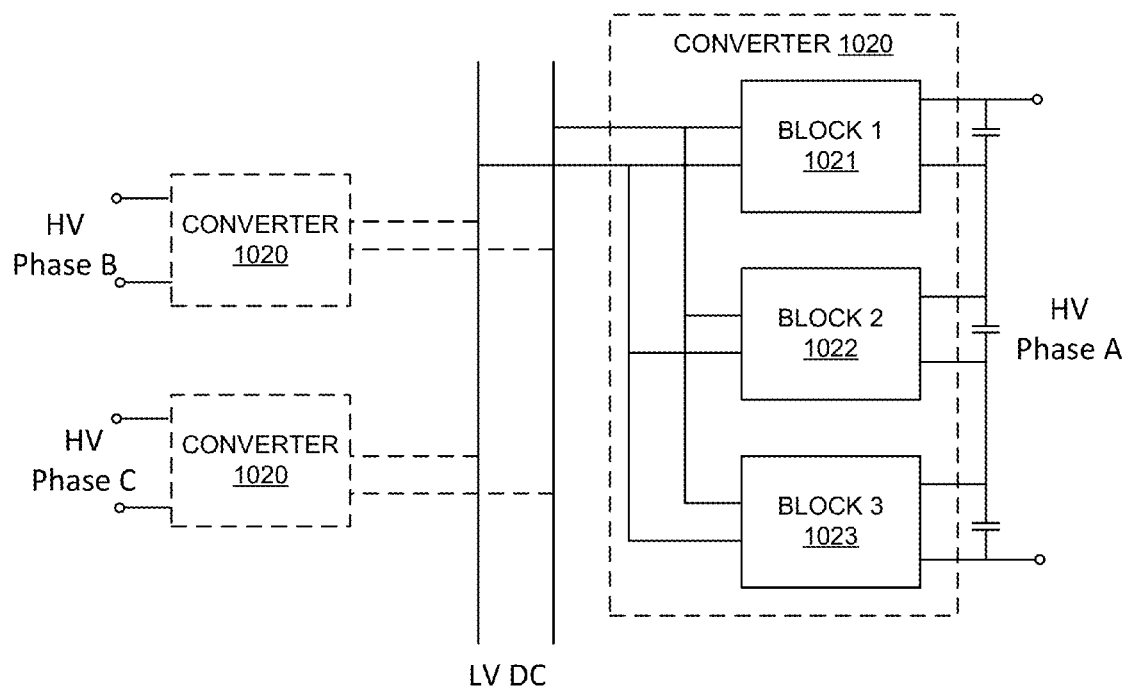
FIG. 10C is a diagram illustrating a three-phase dynamic current medium voltage solid state transformer in accordance with an embodiment.

FIG. 10C is a diagram illustrating a three-phase dynamic current medium voltage solid state transformer in accordance with an embodiment. Various embodiments may stack multiple units to convert medium voltage AC input into DC output, or vice versa, e.g., for battery management systems. Each of the building blocks 1021-1023 may be configured similarly to the Dyna-C medium voltage solid state transformer unit 1000 as illustrated in FIG. 10A. When the AC voltage is zero, the DC bus maintains and controls the magnetizing current $I_m$ of the transformer comprised in each building block to compensate for losses. Various embodiments may be used for MV grid interconnect for PV solar or battery energy storage. The resulting inverter would be compact, lightweight and efficient. By eliminating the 60 Hz transformer and replacing it with a high-frequency transformer, the material and labor cost is greatly reduced as a transformer core volume is inversely proportional to the frequency. The inverter has wide output voltage range and can provide VAR support, even when the system experiences faults such as a short or sag. The inverter has a long life as no electrolytic devices are needed.

A method of using various embodiments of the application as described herein is also provided. A set of input sources and output sources may be provided to an isolated Dyna-C converter. The set of input sources and output sources may comprise a three-phase AC source, a single-phase AC source, a DC source, a three-phase AC load, a single-phase AC load, or a DC load at various voltage levels and may have different ratings. A user may operate various embodiments by cascading or paralleling them based on the different voltage and power requirements.

As used herein, the term set may refer to any collection of elements, whether finite or infinite. As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 8. Various embodiments are described in terms of this example-computing module 800. After reading this description, it will become apparent to a person skilled in the relevant art how to implement the invention using other computing modules or architectures.

Referring now to FIG. 11, computing module 1100 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 1100 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1100 might include, for example, one or more processors, controllers, control modules, or other processing devices, such as a processor 1104. Processor 1104 might be implemented using a general-purpose or special-purpose processing engine such as, for example, a microprocessor, controller, or other control logic. In the illustrated example, processor 904 is connected to a bus 1102, although any communication medium can be used to facilitate interaction with other components of computing module 900 or to communicate externally.

Computing module 1100 might also include one or more memory modules, simply referred to herein as main memory 1108. For example, preferably random access memory (RAM) or other dynamic memory, might be used for storing information and instructions to be executed by processor 1104. Main memory 1108 might also be used for storing temporary variables or other intermediate information during execution of instructions to be executed by processor 1104. Computing module 1100 might likewise include a read only memory ("ROM") or other static storage device coupled to bus 1102 for storing static information and instructions for processor 1104.

The computing module 1100 might also include one or more various forms of information storage mechanism 1110, which might include, for example, a media drive 1112 and a storage unit interface 1120. The media drive 1112 might include a drive or other mechanism to support fixed or removable storage media 1114. For example, a hard disk drive, a floppy disk drive, a magnetic tape drive, an optical disk drive, a CD or DVD drive (R or RW), or other removable or fixed media drive might be provided. Accordingly, storage media 1114 might include, for example, a hard disk, a floppy disk, magnetic tape, cartridge, optical disk, a CD or DVD, or other fixed or removable medium that is read by, written to or accessed by media drive 1112. As these examples illustrate, the storage media 1114 can include a computer usable storage medium having stored therein computer software or data.

In alternative embodiments, information storage mechanism 1110 might include other similar instrumentalities for allowing computer programs or other instructions or data to be loaded into computing module 1100. Such instrumentalities might include, for example, a fixed or removable storage unit 1122 and an interface 1120. Examples of such storage units 1122 and interfaces 1120 can include a program cartridge and cartridge interface, a removable memory (for example, a flash memory or other removable memory module) and memory slot, a PCMCIA slot and card, and other fixed or removable storage units 1122 and interfaces 1120 that allow software and data to be transferred from the storage unit 1122 to computing module 1100.

Computing module 1100 might also include a communications interface 1124. Communications interface 1124 might be used to allow software and data to be transferred between computing module 1100 and external devices. Examples of communications interface 1124 might include a modem or soft modem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1124 might typically be carried on signals, which can be electronic, electromagnetic (which includes optical) or other signals capable of being exchanged by a given communications interface 1124. These signals might be provided to communications interface 1124 via a channel 1128. This channel 1128 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1108, storage unit 1120, media 1114, and channel 1128. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 900 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A dynamic current apparatus of interfacing between a set of AC or DC power sources and loads comprising:
    a first converter comprising a first set of switches;
    a transformer coupled to the first converter, wherein a DC magnetizing current in the transformer serving as an energy storage for transferring power is regulated to a reference value to compensate for losses; and
    a second converter coupled to the transformer, the second converter comprising a second set of switches;
    wherein an input of the first converter is an input of the dynamic current apparatus, an output of the second converter is an output of the dynamic current apparatus, a power flow between the first converter and the second converter is bi-directional.

2. The dynamic current apparatus of claim 1, wherein only two stages of power conversion is required.

3. The dynamic current apparatus of claim 1, wherein the transformer is a high frequency transformer.

4. The dynamic current apparatus of claim 1, wherein the DC magnetizing current is used to regulate an input current or an output current to the reference value with an arbitrary magnitude, frequency, and phase.

5. The dynamic current apparatus of claim 1, further comprising a control module, wherein the control module generates a set of switching signals to regulate the first set of switches and the second set of switches.

6. The dynamic current apparatus of claim 5, wherein the control module includes a leakage management algorithm for driving a first current in a bridge of the first converter to decrease and a second current in a bridge of the second converter to increase simultaneously, a sum of the first current and the second current equals to a magnetizing current of the transformer.

7. The dynamic current apparatus of claim 6, wherein the first converter applies a negative voltage across the transformer and the second converter applies a positive voltage across the transformer to reverse a voltage polarity across a leakage inductance of the transformer.

8. The dynamic current apparatus of claim 5, wherein the first set of switches are regulated to control a magnetizing current of the transformer.

9. The dynamic current apparatus of claim 8, wherein the control module generates the set of switching signals based on a voltage of a load, an active power of the load, and a reactive power of the load.

10. The dynamic current apparatus of claim 1, further comprising a third converter comprising a third set of switches, and a third bridge coupled to the transformer, wherein the transformer is a three-winding transformer.

11. The dynamic current apparatus of claim 10, wherein the first converter is coupled to a first phase of the power source, the second converter is coupled to a second phase of the power source, and the third converter is coupled to a third phase of the power source, a current of the first converter is in quadrature with a voltage of the first converter, a current of the second converter is in quadrature with a voltage of the second converter, and a current of the third converter is in quadrature with a voltage of the third converter.

12. The dynamic current apparatus of claim 1, wherein a power source is an AC power source, wherein a load is a DC load.

13. The dynamic current apparatus of claim 1, wherein a power source is an AC power source, wherein a load is an AC load.

14. The dynamic current apparatus of claim 1, wherein a power source is a DC power source, wherein a load is an AC load.

15. The dynamic current apparatus of claim 1, wherein the load is a balanced three-phase AC load and the second converter comprises three legs.

16. The dynamic current apparatus of claim 1, wherein the load is an unbalanced three-phase AC load and the second converter comprises four legs.

17. The dynamic current apparatus of claim 1, further comprising an input filter comprising a capacitor and an inductor.

18. The dynamic current apparatus of claim 1, wherein a switch of the first set of switches and the second set of switches is an IGBT with a series connected diode.

19. A method of using a dynamic current apparatus, comprising:
    coupling the dynamic current apparatus to a power source;
    coupling the dynamic current apparatus to a load;
    wherein the dynamic current apparatus comprises:
        a first converter comprising a first set of switches;
        a transformer coupled to the first converter; and
        a second converter coupled to the transformer, the second converter comprising a second set of switches;
        wherein the first converter is coupled to the power source, and the second converter is coupled to the load, and a power flow between the first converter and the second converter is bi-directional;
    coupling a second dynamic current apparatus to the power source; and
    coupling the second dynamic current apparatus to the load;
    wherein the second dynamic current apparatus comprises a third converter coupled to a second transformer, and a fourth converter coupled to the second transformer, the third converter is coupled to the power source and the fourth converter is coupled to the load, the first converter and the third converter are coupled in parallel, and the second converter and the fourth converter are coupled in series.

20. The method of claim 19, wherein the dynamic current apparatus further comprises a third converter coupled to a second transformer, wherein the third converter is coupled to the power source, further comprising phase staggering the first converter and the third converter.

21. A method of using a dynamic current apparatus, comprising:
    coupling the dynamic current apparatus to a power source; and
    coupling the dynamic current apparatus to a load;
    wherein the dynamic current apparatus comprises:
        a first converter comprising a first set of switches;
        a transformer coupled to the first converter, wherein a DC magnetizing current in the transformer serving as an energy storage for transferring power is regulated to a reference value to compensate for losses; and a second converter coupled to the transformer, the second converter comprising a second set of switches;

wherein the first converter is coupled to the power source, and the second converter is coupled to the load, and a power flow between the first converter and the second converter is bi-directional.

* * * * *